United States Patent
Farag et al.

(10) Patent No.: US 12,143,966 B2
(45) Date of Patent: *Nov. 12, 2024

(54) METHOD AND APPARATUS FOR INTER-USER EQUIPMENT COORDINATION SIGNALING

(71) Applicant: Samsung Electronics Co., Ltd., Suwon-si (KR)

(72) Inventors: Emad N. Farag, Flanders, NJ (US); Aristides Papasakellariou, Houston, TX (US); Kyeongin Jeong, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/339,223

(22) Filed: Jun. 21, 2023

(65) Prior Publication Data

US 2023/0337192 A1  Oct. 19, 2023

Related U.S. Application Data

(63) Continuation of application No. 17/447,188, filed on Sep. 8, 2021, now Pat. No. 11,690,048.
(Continued)

(51) Int. Cl.
*H04W 72/02* (2009.01)
*H04L 1/1607* (2023.01)
(Continued)

(52) U.S. Cl.
CPC .......... *H04W 72/02* (2013.01); *H04L 1/1678* (2013.01); *H04W 28/26* (2013.01);
(Continued)

(58) Field of Classification Search
CPC ... H04W 72/02; H04W 28/26; H04W 72/121; H04W 72/1215; H04W 72/20;
(Continued)

(56) References Cited

U.S. PATENT DOCUMENTS

2021/0306828 A1  9/2021  Panteleev
2022/0030603 A1  1/2022  Sarkis
(Continued)

FOREIGN PATENT DOCUMENTS

WO  2018174661 A1  9/2018
WO  2020017939 A1  1/2020
WO  2020028662 A1  2/2020

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Ivan O Latorre

(57) ABSTRACT

Methods and apparatuses for inter user equipment (UE) coordination signaling. A method of operating a UE includes determining a first set of first sidelink (SL) resources based on SL sensing and resource exclusion; selecting a first one or more SL resources within the first determined set for reservation, transmitting information about the first one or more SL resources, and receiving inter UE co-ordination information indicating whether a SL resource in the first one or more SL resources has a conflict. The method further includes transmitting on one of the first one or more SL resources, when the one SL resource does not have a conflict; and determining a second set of SL resources based on SL sensing and resource exclusion, and selecting a second one or more SL resources within the second set for
(Continued)

transmission and reservation, when all of the first one or more SL resources have a conflict.

6 Claims, 18 Drawing Sheets

Related U.S. Application Data

(60) Provisional application No. 63/191,177, filed on May 20, 2021, provisional application No. 63/148,572, filed on Feb. 11, 2021, provisional application No. 63/084,910, filed on Sep. 29, 2020, provisional application No. 63/083,541, filed on Sep. 25, 2020, provisional application No. 63/081,023, filed on Sep. 21, 2020.

(51) Int. Cl.
*H04W 28/26* (2009.01)
*H04W 72/12* (2023.01)
*H04W 72/121* (2023.01)
*H04W 72/20* (2023.01)
*H04W 72/23* (2023.01)
*H04W 72/25* (2023.01)
*H04W 72/40* (2023.01)

(52) U.S. Cl.
CPC ..... *H04W 72/121* (2013.01); *H04W 72/1215* (2013.01); *H04W 72/20* (2023.01); *H04W 72/23* (2023.01); *H04W 72/25* (2023.01); *H04W 72/40* (2023.01)

(58) Field of Classification Search
CPC ..... H04W 72/23; H04W 72/25; H04W 72/40; H04W 92/18; H04L 1/1678; H04L 1/1671; H04L 1/1887; H04L 2001/0093; H04L 1/1861; H04L 1/1864; H04L 1/1893; H04L 1/1896; H04L 5/0055
See application file for complete search history.

(56) References Cited

U.S. PATENT DOCUMENTS

| | | |
|---|---|---|
| 2022/0046639 A1 | 2/2022 | Dong |
| 2022/0124682 A1* | 4/2022 | Ko ............... H04W 72/23 |
| 2022/0201654 A1 | 6/2022 | Lee |
| 2022/0216977 A1* | 7/2022 | Hwang .......... H04L 5/0092 |
| 2022/0232525 A1 | 7/2022 | Lee |
| 2022/0232626 A1* | 7/2022 | Li ................. H04W 72/02 |
| 2023/0164816 A1 | 5/2023 | Hwang et al. |
| 2023/0189252 A1* | 6/2023 | Lee ............... H04W 72/1263 370/329 |
| 2023/0199808 A1* | 6/2023 | Lee ............... H04W 72/40 370/280 |

OTHER PUBLICATIONS

"3rd Generation Partnership Project; Technical Specification Group Radio Access Network; NR; Multiplexing and channel coding (Release 16)", 3GPP TS 38.212 V16.1 0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Medium Access Control (MAC) protocol specification (Release 16)", 3GPP TS 38.321 V16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.1.0, Mar. 2020, 247 pages.

International Search Report of the International Searching Authority dated Dec. 17, 2021, in connection with International Application No. PCT/KR2021/012780, 4 pages.

Ericsson, "Feasibility and benefits of mode 2 enhancements for inter-UE coordination," R1-2006445, 3GPP TSG-RAN WG1 Meeting #102-e, e-Meeting, Aug. 17-28, 2020, 7 pages.

Lenovo, et al., "Sidelink resource allocation for Reliability enhancement," R1-2005840, 3GPP TSG RAN WG1 #102-e, E-meeting, Aug. 17-28, 2020, 3 pages.

Oppo,"Inter-UE coordination in mode 2 of NR sidelink," R1-2006011, 3GPP TSG RAN WG1 #102-e, e-Meeting, Aug. 17-28, 2020, 3 pages.

Qualcomm Incorporated, "Reliability and Latency Enhancements for Mode 2," R1-2006829, 3GPP TSG RAN WG1 Meeting #102-e, Aug. 17-28, 2020, 9 pages.

Extended European Search Report issued Sep. 27, 2023 regarding Application No. 23180610.0, 10 pages.

Huawei (Rapporteur), "Summary of [POST111-e] [705] [V2X] Proposal 2-1 and 2-2 (Huawei)", 3GPP TSG-RAN WG2 Meeting #111-e, R2-2008584, Aug. 2020, 12 pages.

Huawei et al., "Remaining details of sidelink resource allocation mode 1", 3GPP TSG RAN WG1 Meeting #100bis-e, R1-2001551, Apr. 2020, 18 pages.

Extended European Search Report issued Feb. 2, 2024 regarding Application No. 21869780.3, 15 pages.

Qualcomm Incorporated, "Reliability and Latency Enhancements for Mode 2", 3GPP TSG RAN WG1 Meeting #102-e, R1-2006829, Aug. 2020, 9 pages.

LG Electronics, "Discussion on feasibility and benefits for mode 2 enhancement", 3GPP TSG RAN WG1 Meeting #102-e, R1-2005749, Aug. 2020, 9 pages.

\* cited by examiner

Step 1: UE-B(s) provide an indication / reservation of a future sidelink (SL) transmission to UE-A.

Step 2: UE-A(a) determines if future transmission collide, and grant/trigger UE-B(s) SL transmission on future SL resource by indicating preferred and/or not preferred resource.

Step 3: UE-B(s) proceed or do not proceed with the SL transmission in indicated SL resource.

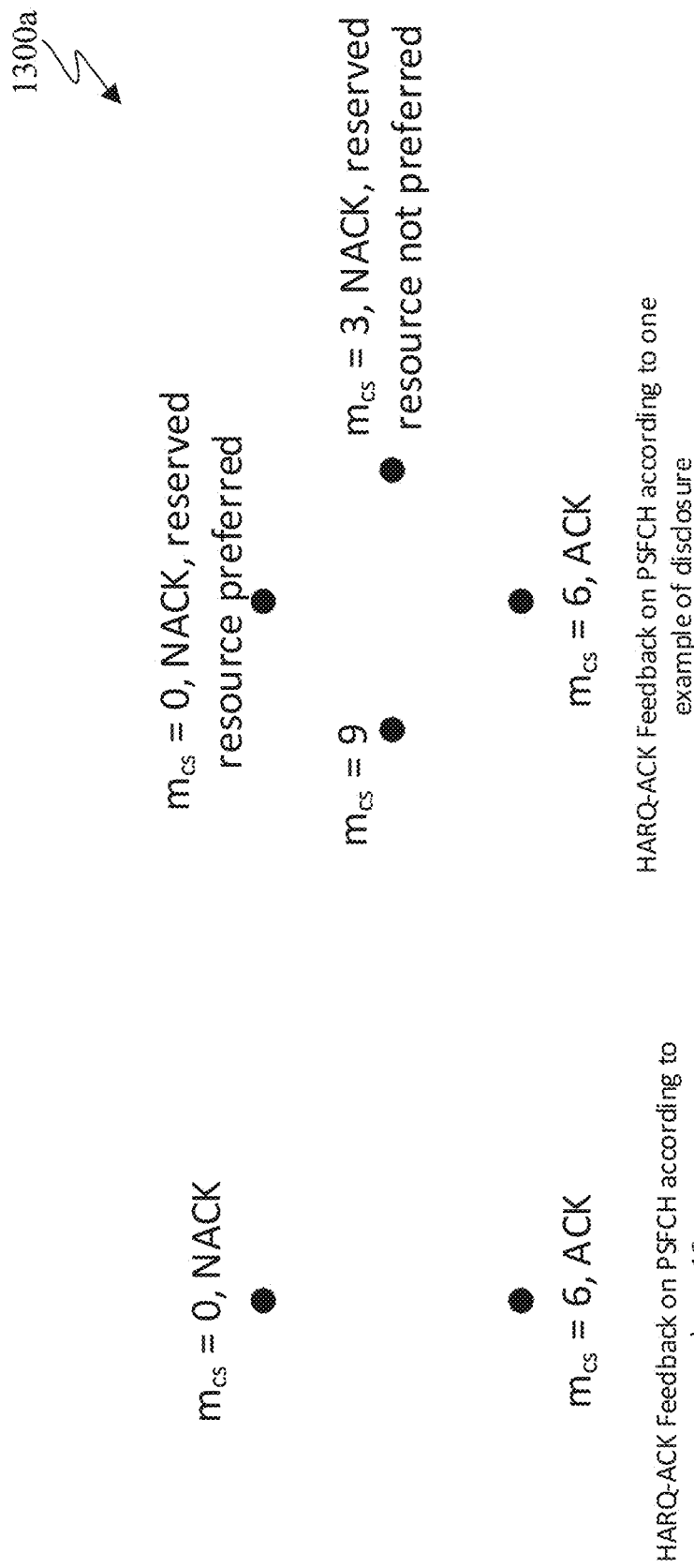

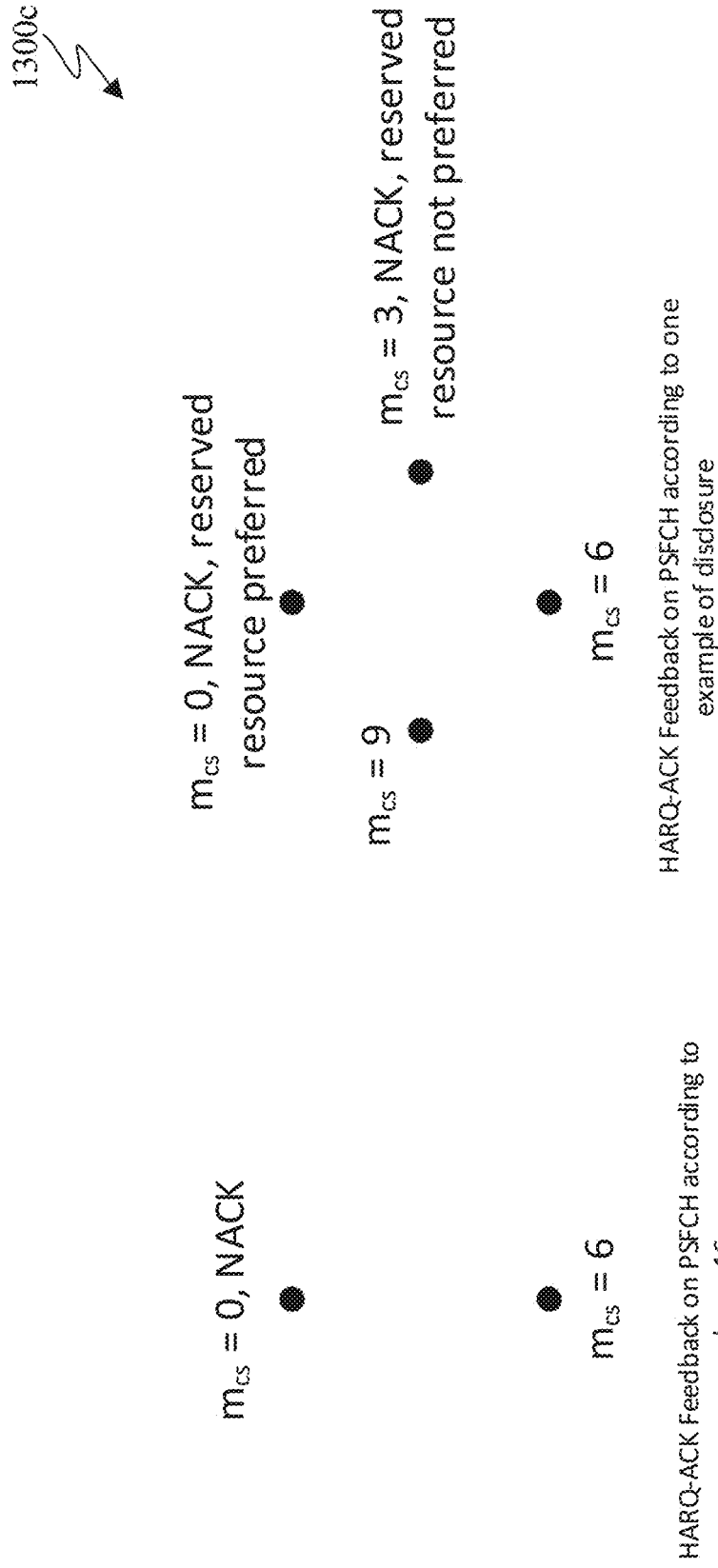

$m_{cs} = 0$, NACK, reserved resource preferred $m_{cs} = 3$, NACK, reserved resource not preferred $m_{cs} = 9$, ACK, reserved resource not preferred $m_{cs} = 6$, ACK, reserved resource preferred HARQ-ACK Feedback on PSFCH according to one example of disclosure $m_{cs} = 0$, NACK $m_{cs} = 6$, ACK HARQ-ACK Feedback on PSFCH according to release 16

FIG. 13E

1300f $m_{cs} = 0$, NACK $m_{cs} = 9$, ACK, reserved resource not preferred $m_{cs} = 0$, NACK, reserved resource preferred $m_{cs} = 3$, NACK, reserved resource not preferred $m_{cs} = 6$ $m_{cs} = 6$ HARQ-ACK Feedback on PSFCH according to release 16

HARQ-ACK Feedback on PSFCH according to one example of disclosure

FIG. 13F

METHOD AND APPARATUS FOR INTER-USER EQUIPMENT COORDINATION SIGNALING

CROSS-REFERENCE TO RELATED APPLICATION AND CLAIM OF PRIORITY

This application is a continuation of U.S. patent application Ser. No. 17/447,188, filed on Sep. 8, 2021, which claims priority under 35 U.S.C. § 119(e) to: U.S. Provisional Patent Application No. 63/081,023 filed on Sep. 21, 2020; U.S. Provisional Patent Application No. 63/083,541 filed on Sep. 25, 2020; U.S. Provisional Patent Application No. 63/084,910 filed on Sep. 29, 2020; U.S. Provisional Patent Application No. 63/148,572 filed on Feb. 11, 2021; and U.S. Provisional Patent Application No. 63/191,177 filed on May 20, 2021. The above-identified provisional patent applications are hereby incorporated by reference in their entirety.

TECHNICAL FIELD

The present disclosure relates generally to wireless communication systems and, more specifically, the present disclosure relates to inter user equipment (UE) coordination signaling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to method and apparatus for inter-UE coordination signaling.

In one embodiment, a UE is provided. The UE includes a processor configured to determine a first set of first sidelink (SL) resources based on SL sensing and resource exclusion and selecting a first one or more SL resources within the first determined set for reservation. The UE further includes a transceiver operably connected to the processor. The transceiver is configured to transmit information about the first one or more SL resources and receive inter UE co-ordination information indicating whether the first one or more SL resources have a conflict. The processor is further configured to configure the transceiver to transmit on one of the first one or more SL resources, when the one SL resource does not have a conflict, and determine a second set of SL resources based on SL sensing and resource exclusion, and selecting a second one or more SL resources within the second set for transmission and reservation, when all of the first one or more SL resources have a conflict.

In another embodiment, another UE is provided. The UE includes a transceiver configured to receive information about one or more SL resources indicated as reserved from a second UE. The UE further includes a processor operably connected to the transceiver. The processor configured to determine whether there is a conflict in the one or more SL resources indicated as reserved. The transceiver is further configured to transmit inter UE co-ordination information indicating whether the one or more SL resources indicated as reserved have the conflict.

In yet another embodiment, a method of operating a UE is provided. The method includes determining a first set of first SL resources based on SL sensing and resource exclusion; selecting a first one or more SL resources within the first determined set for reservation, transmitting information about the first one or more SL resources, and receiving inter UE co-ordination information indicating whether a SL resource in the first one or more SL resources has a conflict. The method further includes transmitting on one of the first one or more SL resources, when the one SL resource does not have a conflict; and determining a second set of SL resources based on SL sensing and resource exclusion, and selecting a second one or more SL resources within the determined second set for transmission and reservation, when all of the first one or more SL resources have a conflict.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A-13F illustrate example physical sidelink feedback channel (PSFCH) signaling according to embodiments of present disclosure.

DETAILED DESCRIPTION

Figure 1:
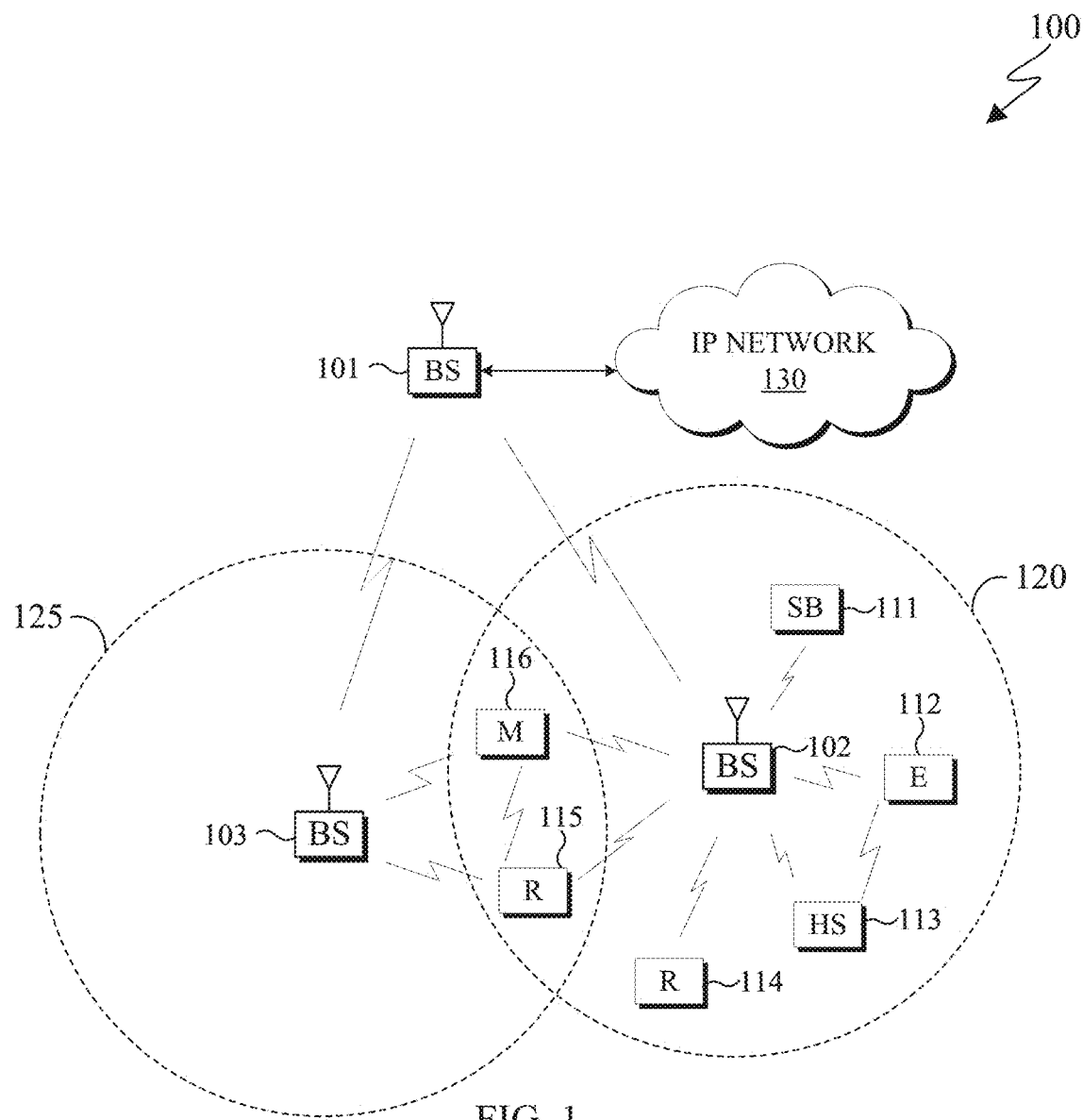
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

U.S. patent application Ser. No. 17/139,908 filed on Dec. 31, 2020;

3GPP TS 38.211 v16.1.0, "NR; Physical channels and modulation;"

3GPP TS 38.212 v16.1.0, "NR; Multiplexing and Channel coding;"

3GPP TS 38.213 v16.1.0, "NR; Physical Layer Procedures for Control;"

3GPP TS 38.214 v16.1.0, "NR; Physical Layer Procedures for Data;"

3GPP TS 38.321 v16.0.0, "NR; Medium Access Control (MAC) protocol specification;"

3GPP TS 38.331 v16.0.0, "NR; Radio Resource Control (RRC) Protocol Specification;" and 3GPP TS 36.213 v16.1.0, "Evolved Universal Terrestrial Radio Access (E-UTRA); Physical layer procedures."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
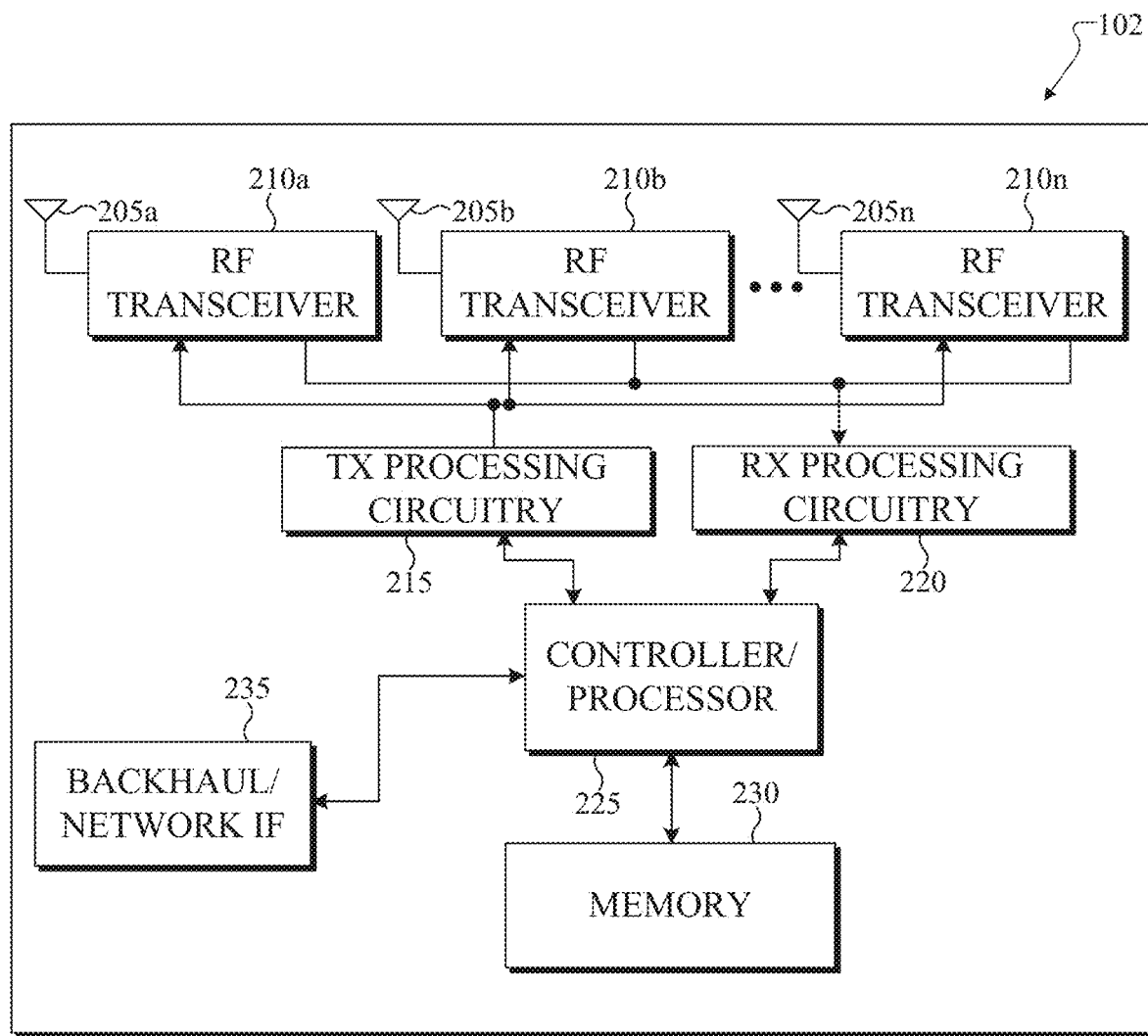
FIG. 2 illustrates an example base station (BS) according to embodiments of the present disclosure.
Figure 3:
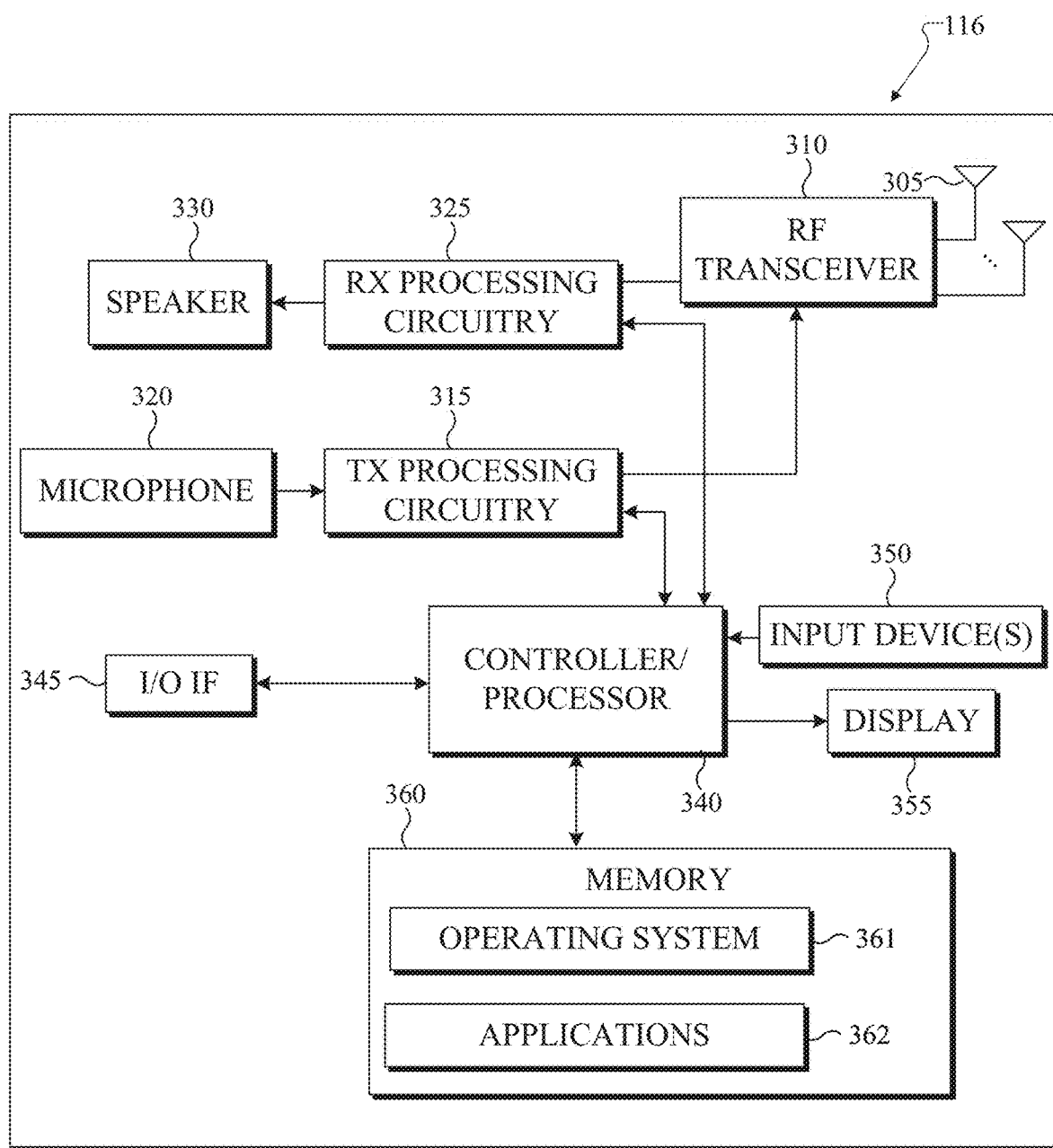
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of UEs within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In various embodiments, a UE 116 may communicate with another UE 115 via a sidelink. For example, both UEs 115-116 can be within network coverage (of the same or different base stations). In another example, the UE 116 may be within network coverage and the other UE may be outside network coverage. In yet another example, both UE are outside network coverage.

In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for inter UE coordination signaling. In certain embodiments, and one or more of the BSs 101-103 includes circuitry, programming, or a combination thereof to allow inter UE coordination signaling.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support inter UE coordination signaling. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as inter UE coordination signaling is stored in memory.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100 or by another UE. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals or sidelink channel signals and the transmission of uplink channel signals or sidelink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management and inter-UE coordination. The processor 340 can move data into or out of the memory 360 as required by an executing process. In some embodiments, the processor 340 is configured to execute the applications 362 based on the OS 361 or in response to signals received from BSs or other UEs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Also, while FIG. 3 illustrates the UE 116 configured as a mobile telephone or smartphone, UEs could be configured to operate as other types of mobile or stationary devices.

Figure 4:
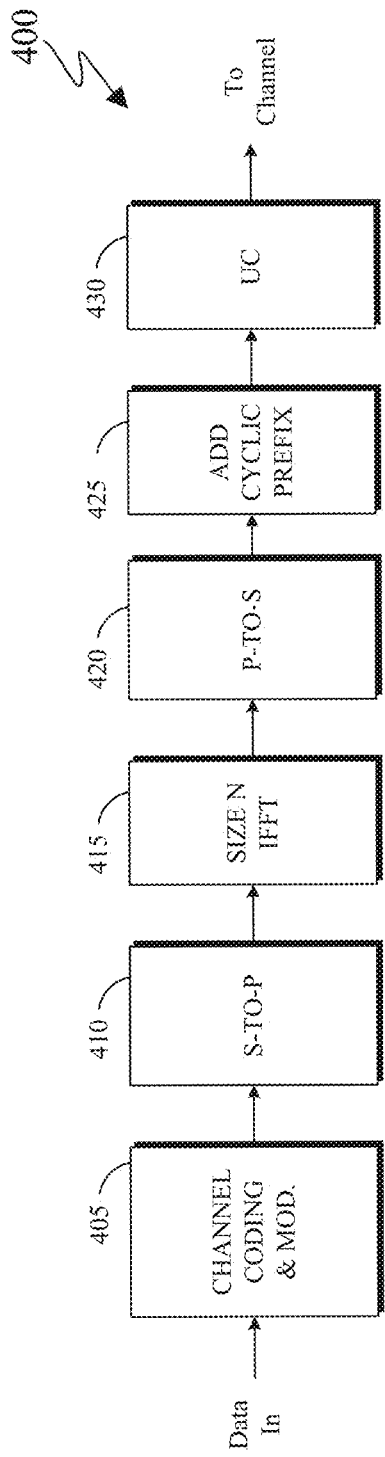
FIGS. 4 and 5 illustrate example wireless transmit and receive paths according to embodiments of present disclosure.
Figure 5:
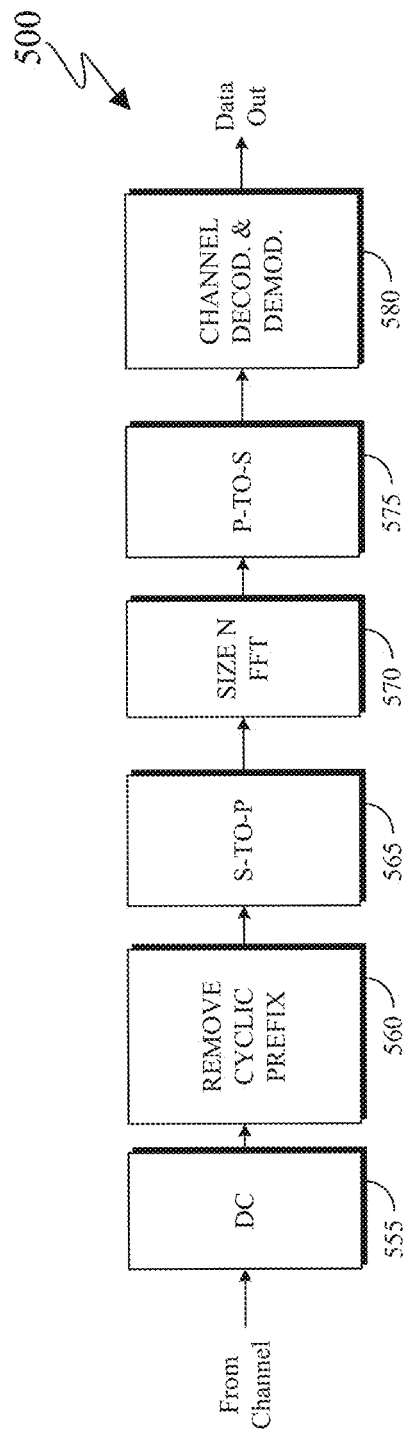

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116. Alternatively, for sidelink operation, the transmitted RF signal from the UE 115 arrives at the UE116 after passing through the wireless channel, and reverse operations to those at the UE 115 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103, or transmitting in the sidelink to other UEs and may implement the receive path 500 for receiving in the downlink from the BSs 101-103, or receiving in the sidelink from other UEs.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for (i) downlink (DL) signaling on a cell, (ii) uplink (UL) signaling on a cell, or (iii) sidelink (SL) signaling is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. For another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can configure one or more bandwidth parts (BWPs) of a system BW for transmissions or receptions of signals or channels. Furthermore, slots can be organized in subframes It is noted that a subframe has a time duration of 1 ms. Subframes can be further organized into radio frames or simply frames wherein a frame has a duration of 10 ms.

SL signals and channels are transmitted and received on sub-channels within a resource pool, where a resource pool is a set of time-frequency resources used for SL transmission and reception within a SL BWP. SL channels can include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals can include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes, such as a unicast mode a groupcast mode, a broadcast mode, a resource allocation mode, and the like. In a unicast mode, a PSCCH/PSSCH conveys SL information from one UE to only one other UE. In a groupcast mode, a PSCCH/PSSCH conveys SL information from one UE to a group of UEs within a (pre-) configured set. In a broadcast mode, a PSCCH/PSSCH conveys SL information from one UE to all surrounding UEs.

In certain embodiments, there are two resource allocation modes for a PSCCH/PSSCH transmission. In resource allocation mode 1, a gNB (such as the BS 102) schedules a UE on the SL and conveys scheduling information to the UE transmitting on the SL through a DCI format. In addition, resource allocation mode 1 supports configured grant type 1 and configured grant type 2. In configured grant type 1, resources are periodically configured for transmission of SL data. In configuration grant type 2, a DCI activates transmission on periodically allocated resources starting with a first PSCCH/PSSCH transmission opportunity where the configured sidelink grant was (re-)initialized.

In resource allocation mode 2, a UE (such as the UE 116) schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE. In the first HARQ-ACK reporting option, a UE can attempt to decode a transport block (TB) in a PSSCH reception. For example, the UE can detect a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB In the second option, a UE (such as the UE 116) can attempt to decode a TB if, for example, the UE detects a SCI format that schedules a corresponding PSSCH. If the UE correctly decodes the TB, the UE multiplexes an ACK in a PSFCH transmission. Otherwise, if the UE does not correctly decode the TB, the UE multiplexes a NACK in a PSFCH transmission.

In HARQ-ACK reporting option one above, when a UE (such as the UE 116) that transmitted the PSSCH detects a NACK in a PSFCH reception, the UE can transmit another PSSCH with the TB (retransmission of the TB). In HARQ-ACK reporting option two above, when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by Equation (1) and can be configured, for example, at least using a bitmap. In Equation (1), below, $T'_{MAX}$ is the number of SL slots in a resource pool. Within each slot $t'_y{}^{SL}$ of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by Equation (2). In Equation (2), below, j=0, 1, . . . , $n_{subCHsize}-1$, $n_{subCHstart}$ and $n_{subCHsize}$ are provided by higher layer parameters.

$$\{t'_0{}^{SL}, t'_1{}^{SL}, t'_2{}^{SL}, \ldots, t'_{T'_{MAX}-1}{}^{SL}\} \quad (1)$$

$$n_{PRB} = n_{subCHstart} + m \cdot n_{subCHsize} + j \quad (2)$$

In certain embodiments, the slots of a SL resource pool are determined as follows. First, a set of slots that may belong to a resource be denoted by Equation (1), above, where $0 \le t_i^{SL} < 10240$, and $0 \le i < T_{max}$. The slot index is relative to slot #0 of SFN #0 of the serving cell, or DFN #0. The set slot includes all slots except $N_{S-SSB}$ slots that are configured for SL SS/PBCH Block (S-SSB). The set slot also does not include $N_{nonSL}$ slots where at least one SL symbols is not not-semi-statically configured as UL symbol by higher layer parameter tdd-UL-DL-ConfigurationCommon or sl-TDD-Configuration. In a SL slots, OFDM symbols Y-th, (Y+1)-th, . . . , (Y+X−1)-th are SL symbols, where Y is determined by the higher layer parameter sl-StartSymbol and X is determined by higher layer parameter sl-LengthSymbols. Additionally, the set slot also does not include $N_{reserved}$ reserved slots, e.g., these slots are excluded from the resource pool. Reserved slots are determined such that the slots in the set $\{t_0{}^{SL}, t_1{}^{SL}, t_2{}^{SL}, \ldots, t_{T_{MAX}-1}{}^{SL}\}$ is a multiple of the bitmap length ($L_{bitmap}$), where the bitmap ($b_0, b_1, \ldots, b_{L_{bitmap}-1}$) is configured by higher layers.

It is noted that the reserved bits are determined based on $\{l_0, l_1, \ldots, l_{2^\mu \times 10240 - N_{S-SSB} - N_{nonSL}-1}\}$ and the set of slots are in the range $0 \ldots 2^\mu \times 10240 - 1$, excluding S-SSB slots and non-SL slots. The slots are arranged in ascending order of the slot index. The number of reserved slots, excluded from the resource pool, is given by Equation (6). The reserved slots $l_r$ are given by Equation (7). $T_{max}$ is described in Equation (8).

$$N_{reserved} = (2^\mu \times 10240 - N_{S-SSB} - N_{nonSL}) \bmod L_{bitmap}. \quad (6)$$

$$r = \left\lfloor \frac{m \cdot (2^\mu \times 10240 - N_{S-SSB} - N_{nonSL})}{N_{reserved}} \right\rfloor, \text{ where,} \quad (7)$$

$$m = 0, 1, \ldots, N_{reserved}$$

$$T_{max} = 2^\mu \times 10240 - N_{S-SSB} - N_{nonSL} - N_{reserved}. \quad (8)$$

In certain embodiments, the slots are arranged in ascending order of slot index.

For resource (re-)selection or re-evaluation in slot n, a UE can determine a set of available single-slot resources for transmission within a resource selection window [n+$T_1$, n+$T_2$], such that a single-slot resource for transmission, $R_{x,y}$ is defined as a set of $L_{subCH}$ contiguous subchannels x+i, where i=0, 1, . . . , $L_{subCH}$−1 in slot $t_y^{SL}$. $T_1$ is determined by the UE such that, $0 \leq T_1 \leq T_{proc,1}^{SL}$, where $T_{proc,1}^{SL}$ is a PSSCH processing time. $T_2$ is determined by the UE such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

In certain embodiments, the resource (re-)selection is a two-step procedure. The first step is based on sensing and resource exclusion, which is to identify the candidate resources within a resource selection window. Wherein, sensing includes decoding first stage/part SCI and measuring SL RSRP, wherein the SL RSRP can measured on PSCCH DMRS or PSSCH DMRS. Candidate resources are resources that belong to a resource pool, but exclude resources that were previously reserved, or potentially reserved by other UEs. The resources excluded are based on first stage/part SCIs decoded in a sensing window and for which the UE measures a SL reference signal receive power (RSRP) that exceeds a threshold. The threshold depends on the priority indicated in a SCI format and on the priority of the SL transmission. The resources excluded are based on reserved transmissions or semi-persistent transmissions that can collide with the excluded resources or any of reserved or semi-persistent transmissions. The second step includes selecting or re-selecting a resource from the identified candidate resources.

A resource pool can be configured by higher layer parameter sl-MultiReserveResource, to allow reservation of a sidelink resource for an initial transmission of a Transport Block (TB), by an SCI associated with a different TB based on sensing and resource selection procedure. The set of possible reservation periods is provided by higher layer parameter sl-ResourceReservePeriodList.

It is noted that during the first step of the resource (re-)selection procedure described above, a UE can monitor slots in a sensing window [n−$T_0$, n−$T_{proc,0}$), where the UE monitors slots belonging to a corresponding sidelink resource pool that are not used for the UE's own transmission. Sensing includes: decoding the first stage/part SCI on PSCCH and measuring the SL RSRP, wherein the SL RSRP can be measured on the PSCCH DMRS or the PSSCH DMRS. To determine a candidate single-slot resource set to report to higher layers, a UE excludes, the following, from the set of available single-slot resources for SL transmission within a resource pool and within a resource selection window. The UE can exclude a single slot resource $R_{x,y}$, such that for any slot $t_m^{SL}$ not monitored within the sensing window with a hypothetical received SCI Format 1-0, with a "Resource reservation period" set to any periodicity value allowed by a higher layer parameter sl-ResourceReservePeriodList, and indicating all sub-channels of the resource pool in this slot, satisfies condition below. The UE can also exclude single slot resource $R_{x,y}$, such that for any received SCI within the sensing window. The associated L1-RSRP measurement is above a (pre-)configured SL-RSRP threshold, where the SL-RSRP threshold depends on the priority indicated in the received SCI and that of the SL transmission for which resources are being selected. The condition describes that the received SCI in slot $t_m^{SL}$, or if "Resource reservation field" is present in the received SCI the same SCI is assumed to be received in slot $t_{m+q \times P_{rsvp\_Rx}'}^{SL}$, indicates a set of resource blocks that overlaps $R_{x,y+j \times P_{rsvp\_Tx}'}$. It is noted that q=1, 2, . . . , Q when Equation (3) is satisfied. Otherwise Q=1.

$$P_{rsvp\_RX} \leq T_{scal} \text{ and } n' - m < P'_{rsvp\_RX} \rightarrow Q = \left\lceil \frac{T_{scal}}{P_{rsvp\_RX}} \right\rceil. \quad (3)$$

$T_{scal}$ is $T_2$ in units of milli-seconds

Additionally, if n belongs to $(t'_0^{SL}, t'_1^{SL}, \ldots, t'_{T'_{max}-1}^{SL})$, then n'=n, otherwise n' is the first slot after slot n belonging to set $(t'_0^{SL}, t'_1^{SL}, \ldots, t'_{T'_{max}-1}^{SL})$. Moreover, j=0, 1, . . . , $C_{resel}$−1. $P_{rsvp\_RX}$ is the indicated resource reservation period in the received SCI in physical slots, $P_{rsvp\_Rx}'$ is that value converted to logical slots as described later in this disclosure, and $P_{rsvp\_Tx}'$ is the resource reservation period of the SL transmissions for which resources are being reserved in logical slots.

If the candidate resources are less than a (pre-)configured percentage (such as 20% of the total available resources within the resource selection window), then the (pre-) configured SL-RSRP thresholds are increased by a predetermined amount, such as 3 dB.

NR sidelink introduced two new procedures for mode 2 resource allocation; re-evaluation and pre-emption check.

Regarding the re-evaluation check, the re-evaluation check occurs when a UE (such as the UE 116) checks the availability of pre-selected SL resources before the resources are first signaled in an SCI Format, and if needed re-selects new SL resources. For a pre-selected resource to be first-time signaled in slot m, the UE performs a re-evaluation check at least in slot m−$T_3$. The re-evaluation check includes performing the first step of the SL resource selection procedure, which involves identifying a candidate (available) sidelink resource set in a resource selection window as previously described. The re-evaluation check also includes that if the pre-selected resource is available in the candidate sidelink resource set, then the resource is used/signaled for sidelink transmission. Otherwise, the pre-selected resource is not available in the candidate sidelink resource set, a new sidelink resource is re-selected from the candidate sidelink resource set.

Regarding the pre-emption check, the pre-emption check occurs when a UE (such as the UE 116) checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−$T_3$. When pre-emption check is enabled by higher layers, pre-emption check can include the following examples. For example, the pre-emption check can include performing the first step of the SL resource selection procedure, which involves identifying candidate (available) sidelink resource set in a resource selection window as previously described. Additionally, if the pre-selected and reserved resource is available in the candidate sidelink resource set, then the resource is used/signaled for sidelink transmission, otherwise the pre-selected and reserved resource is not available in the candidate sidelink resource set. The resource is excluded from the candidate resource set due to an SCI, associated with a priority value $P_{RX}$, having a SL RSRP exceeding a threshold, wherein the SL RSRP is based on one of PSCCH DMRS or PSSCH DMRS. Let the priority value of the sidelink resource being checked for pre-emption be $P_{TX}$. Moreover, if the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority. Otherwise, the resource is used/signaled for sidelink transmission.

It is noted that the 3GPP Release 16 is the first NR release to include sidelink through work item "5G V2X with NR sidelink." The mechanisms introduced focused mainly on vehicle-to-everything (V2X) and can be used for public safety when the service requirement can be met. Release 17 extends sidelink support to more use cases through work item "NR Sidelink enhancement." One of the motivations for the sidelink enhancement in Release 17, is power savings. For example, the power savings enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement work item, is to specify resource allocation enhancements that reduce power consumption, taking the principle of the release 14 LTE sidelink random resource selection and partial sensing as baseline with potential enhancements. For example, resource allocation enhancements can include specifying resource allocation to reduce power consumption of the UEs [RAM, RAN2]. The baseline is to introduce the principle of Rel-14 LTE sidelink random resource selection and partial sensing to Rel-16 NR sidelink resource allocation mode 2. It is noted that taking Rel-14 as the baseline does not preclude introducing a new solution to reduce power consumption for the cases where the baseline cannot work properly.

Another motivation for the sidelink enhancement includes enhanced reliability and reduced latency. Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

For yet another objective of the release 17 sidelink enhancement is to study the feasibility and benefits of enhancements to resource allocation mode 2, wherein a set of resources can be determined at UE-A and sent to UE-B, and UE-B takes into account this set for its own transmission. For example, the study the feasibility and benefit of the enhancement(s) in mode 2 for enhanced reliability and reduced latency and specify the identified solution if deemed feasible and beneficial. For instance, a set of resources is determined at UE-A. This set is sent to UE-B in mode 2, and UE-B takes this into account in the resource selection for its own transmission.

Embodiments of the present disclosure take into consideration that, the UE transmitting sidelink information (e.g., UE-B) is not aware of the sidelink environment at the UE receiving the sidelink information (UE-A), without receiving sidelink resource selection assistance information (i.e., inter-UE co-ordination information) from UE-A. For example, the hidden node problem is when a third UE or node is causing interference or is attempting to transmit to UE-A at the same time that UE-B is attempting to transmit to UE-A, but is not discerned by UE-B. When UE-A provides resource selection assistance information to UE-B, it can assist UE-B in making resource allocation decisions that avoid the hidden node problem when transmitting to UE-A. In another example, the exposed node problem is when a sidelink resource is being sensed as occupied at UE-B, i.e., the UE transmitting the sidelink information, but is not being sensed as occupied at UE-A, i.e., the UE receiving the sidelink information. If UE-B were to only use its sensing information it would not transmit on the resource to UE-A. However, if UE-B gets resource selection assistance information from UE-A, UE-B can allocate the resource for sidelink transmission to UE-A. Resource selection assistance information, for example, can be whether a SL resource is preferred or not for SL transmission.

Additionally, embodiments of the present disclosure take into consideration that the UE transmitting sidelink information (e.g., UE-B) is not aware whether the intended receiver UE of the sidelink information is receiving or transmitting at the time of transmission from UE-B without receiving sidelink resource selection assistance information (i.e., inter-UE co-ordination information) from UE-A. For example, the half-duplex problem occurs when a first UE is transmitting information on a sidelink to a second UE at a time (i.e., in a slot and/or a symbol), when the second UE is transmitting, and the second UE is unable to receive the SL transmission of the first UE. Resource selection assistance information, for example, can be whether a SL resource is preferred or not for SL transmission, and can at least be determined partially on whether a SL resource can be received by a second UE.

As described in U.S. application Ser. No. 17/139,908 filed on Dec. 31, 2020, which is incorporated by reference in its entirety, a first UE(s) can transmit a pre-indication of its intention to transmit or resource reservation on a SL resource to a second UE(s). The second UE(s) can grant or trigger the SL transmission of the first UE(s). Embodiments of the present disclosure describe the signaling aspects of the pre-indication or resource reservation from a first UE(s) (e.g., UE-B(s)) to a second UE(s) (e.g., UE-A(s)). Embodiments of the present disclosure describe the signaling aspects of the grant or triggering from the second UE(s) (e.g., UE-A(s)) to the first UE(s) (e.g., UE-B(s)), wherein the grant or trigger can indicate preferred or non-preferred SL resources.

As discussed above, 3GPP Release 16 includes sidelink through work item "5G V2X with NR sidelink," the mechanisms introduced focused mainly on vehicle-to-everything (V2X) and can be used for public safety when the service requirement can be met. Release 17 extends sidelink support to more use cases through work item "NR Sidelink enhancement". One of the motivations for the sidelink enhancement, in Release 17, is enhanced reliability and reduced latency. One of the objectives of the Release 17 sidelink enhancement is to study the feasibility and benefit of inter-UE coordination by having a set of resources determined at UE-A indicated to a UE-B, and UE-B takes into account this information for its SL transmission.

Embodiments of this disclosure describe that the set of resources determined at a UE-A (such as UE 116) can be based on resources from one or more UE-Bs (such as UE 116) that can potentially overlap and collide for example due to the hidden node problem. Alternatively, or additionally the set of resources can be based on UE-A's own sensing. Alternatively, or additionally the set of resources can be based on UE-A's intended transmissions for example to avoid the half-duplex problem. UE-A can indicate to the one or more UE-Bs whether the determined SL resources are preferred or non-preferred. Non-preferred resources are resources that have a collision or conflict with another SL or UL transmission.

Embodiments of this disclosure introduces signaling and methods for pre-indication or reservation of a SL transmission on a SL resource. Additionally, embodiments of this disclosure introduces signaling and methods for granting or triggering a transmission on a SL resource, such as by an indication of preferred and/or non-preferred resources. Non-preferred resources are resources that have a collision or conflict with another SL or UL transmission.

Embodiments of the present disclosure define UE-B as an SL UE transmitting SL information on a SL resource. The network can include one or more UE-B Embodiments of the present disclosure define UE-A as a SL-UE that is the intended receiver of a SL transmission from a UE-B. Alternatively, UE-A can be any other SL UE in the network.

In this discourse a PSFCH channel used for signaling (e.g., signaling pre-indicated or reserved resources, or signaling preferred/non-preferred resources or resources with or without conflict) is a PSFCH-like channel or a feedback channel. A PSFCH-like channel or a feedback channel is a physical channel with same structure as that of PSFCH (as described in 38.211), i.e., the Physical channel can include 12 orthogonal sequences multiplexed into one PRB. Each one or two sequences is used to convey one bit of information. The PSFCH has a duration of two symbols, the first symbol is a repetition of the second symbol.

Figure 6:
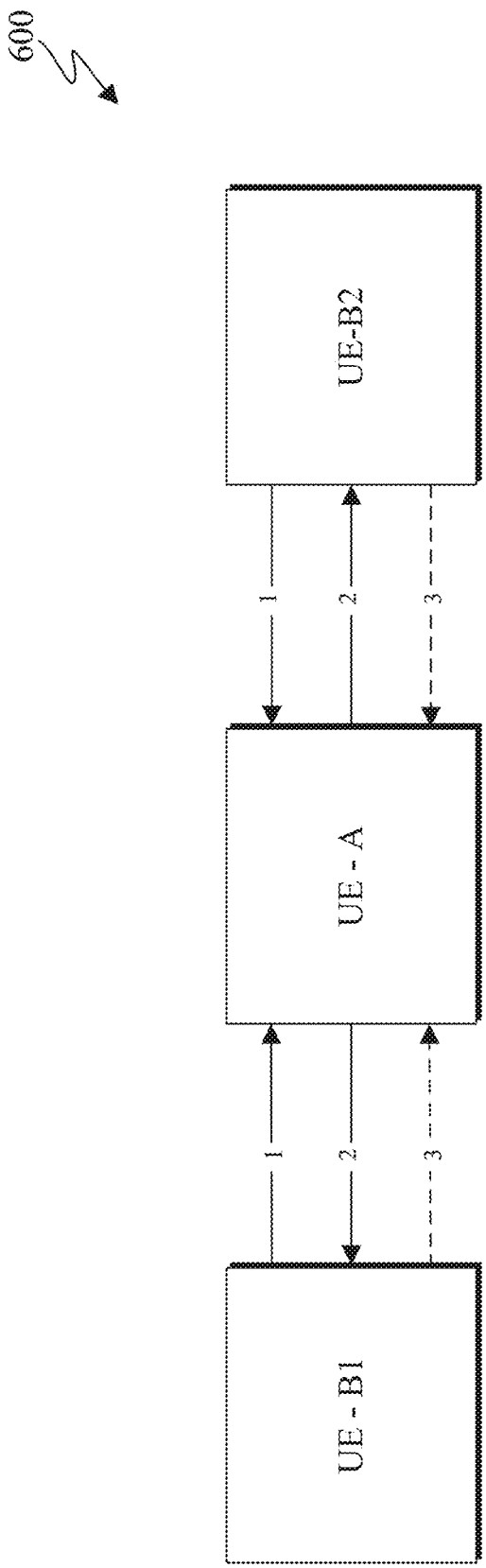
FIG. 6 illustrates an example SL network according to embodiments of present disclosure.

FIG. 6 illustrates an example SL network 600 according to embodiments of present disclosure. The SL network 600 includes 3 SL UEs, that of UE-A, UE-B1, and UE-B2. It is noted that there can be additional SL UEs in the network. As illustrated in the SL network 600 the UE-A, UE-B1, and UE-B2 are capable of receiving and transmitting on the SL air interface. It is noted that UE-A, UE-B1, and UE-B2 can be similar to any of the UEs of FIG. 1 and include similar components to that of the UE 116. There are two UE-Bs, (i.e., UE-B1 and UE-B2) with data to transmit on the SL interface, and there is one UE-A. The UE-A can be the intended receiver of the UE-B1 and UE-B2 transmissions, or just the intended receiver of the UE-B1 or UE-B2 transmissions, or any other SL UE in the network.

In step one, according to FIG. 6, a UE-B indicates its intention to transmit on a future SL resource. The following examples and embodiments describe step 1.

For example (example 0.1.1), a UE-B indicates its intention to transmit on a future SL resource or reserves a future SL resource using a PSFCH-like transmission or a feedback channel.

For another example (example 0.1.2), a UE-B indicates its intention to transmit on a future SL resource or reserves a future SL resource using a PSCCH transmission. For instance, the PSCCH can include resource indication for a current sub-frame as well as reserved resources for a future sub-frame, wherein the reserved resource(s) can be for a retransmission of the current transmission (if needed or if applicable) and/or the reserved resource(s) can be for a new transmission. For another instance, the PSCCH transmission, can be a PSCCH transmission with no PSSCH transmission in the current subframe, and only includes resources reserved in future subframe. Please refer to component 2 for more details.

For yet another example (example 0.1.3), a UE-B indicates its intention to transmit on future SL resource or reserves a future SL resource using a newly defined physical channel.

For another example (example 0.1.4), a UE-B indicates its intention to transmit on future SL resource or reserves a future SL resource using second stage/part SCI on PSSCH.

For another example (example 0.1.5), a UE-B indicates its intention to transmit on future SL resource or reserves a future SL resource using SL shared channel on PSSCH.

For another example (example 0.1.6), a UE-B indicates its intention to transmit on future SL resource or reserves a future SL resource using SL MAC CE.

In step two, according to FIG. 6, a UE-A after receiving pre-indication or resource reservation of a future SL transmission from one or more UE-B(s), determines if an overlap (full overlap or partial overall) or a collision can occur on a future SL resource. Thereafter the UE-A consequently, grant or trigger a SL transmission on a SL resource from a UE-B, i.e., UE-A determines the availability or non-availability (in case of a conflict) of the resources indicated or reserved by UE-B. The collision or overlap in time and frequency domains of a pre-indicated or reserved SL resource can be with another pre-indicated or reserved SL resource at UE-A. Additionally or alternatively, the collision or overlap in time and frequency domains of a pre-indicated or reserved SL resource can be with a SL resource based on the sensing at UE-A. Additionally or alternatively, the collision or overlap of a pre-indicated or reserved SL resource can be with SL resource used by UE-A for its SL transmission, the overlap in this case can be in time domain. The grant or triggering of a SL transmission on a SL resource can be based on indication of preferred and/or non-preferred SL resources. Non-preferred resources are resources that have a collision or conflict with another SL or UL transmission. The following examples and embodiments describe step 2.

For example (example 0.2.1), a UE-A grants or triggers a SL transmission on a SL resource using a PSFCH-like transmission or a feedback channel. Please refer to component 1 for more details.

For another example (example 0.2.2), a UE-A grants or triggers a SL transmission on a SL resource using a PSCCH transmission. Please refer to component 2 for more details.

For another example (example 0.2.3), a UE-A grants or triggers a SL transmission on a SL resource using a newly defined physical channel.

For another example (example 0.2.4), a UE-A grants or triggers a SL transmission on a SL resource using second stage/part SCI on PSSCH.

For another example (example 0.2.5), a UE-A grants or triggers a SL transmission on a SL resource using SL shared channel on PSSCH.

For yet another example (example 0.2.6), a UE-A grants or triggers a SL transmission on a SL resource using SL MAC CE.

In step three, after a UE-B receives a grant or trigger signal, indicating a preferred or non-preferred resource for a UE-B, the UE-B can determine whether or not to proceed with a SL transmission on a pre-indicated or reserved SL resource. Non-preferred resources are resources that have a collision or conflict with another SL or UL transmission. If the reserved resource is indicated to have a conflict, UE-B performs resource re-selection to select a new resource for SL transmission.

Figure 7:
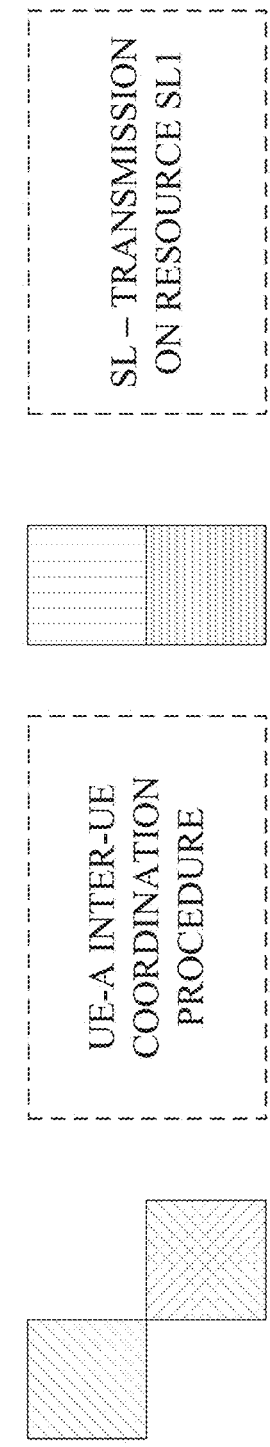
FIG. 7 illustrates a timeline for a SL transmission on a future SL resource according to embodiments of present disclosure.
Figure 8:
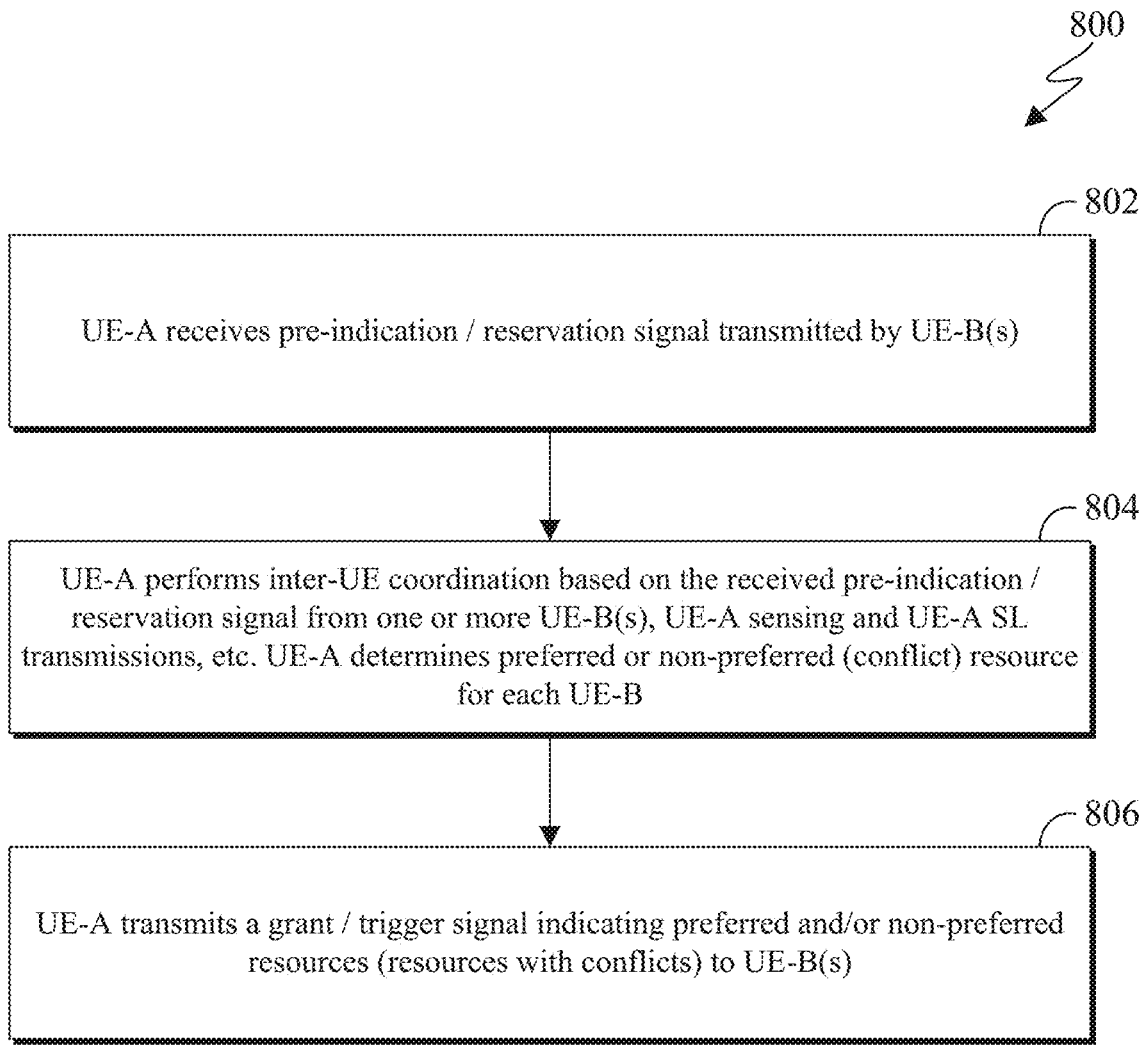
FIGS. 8 and 9 illustrate example methods for a UE according to embodiments of present disclosure.
Figure 9:
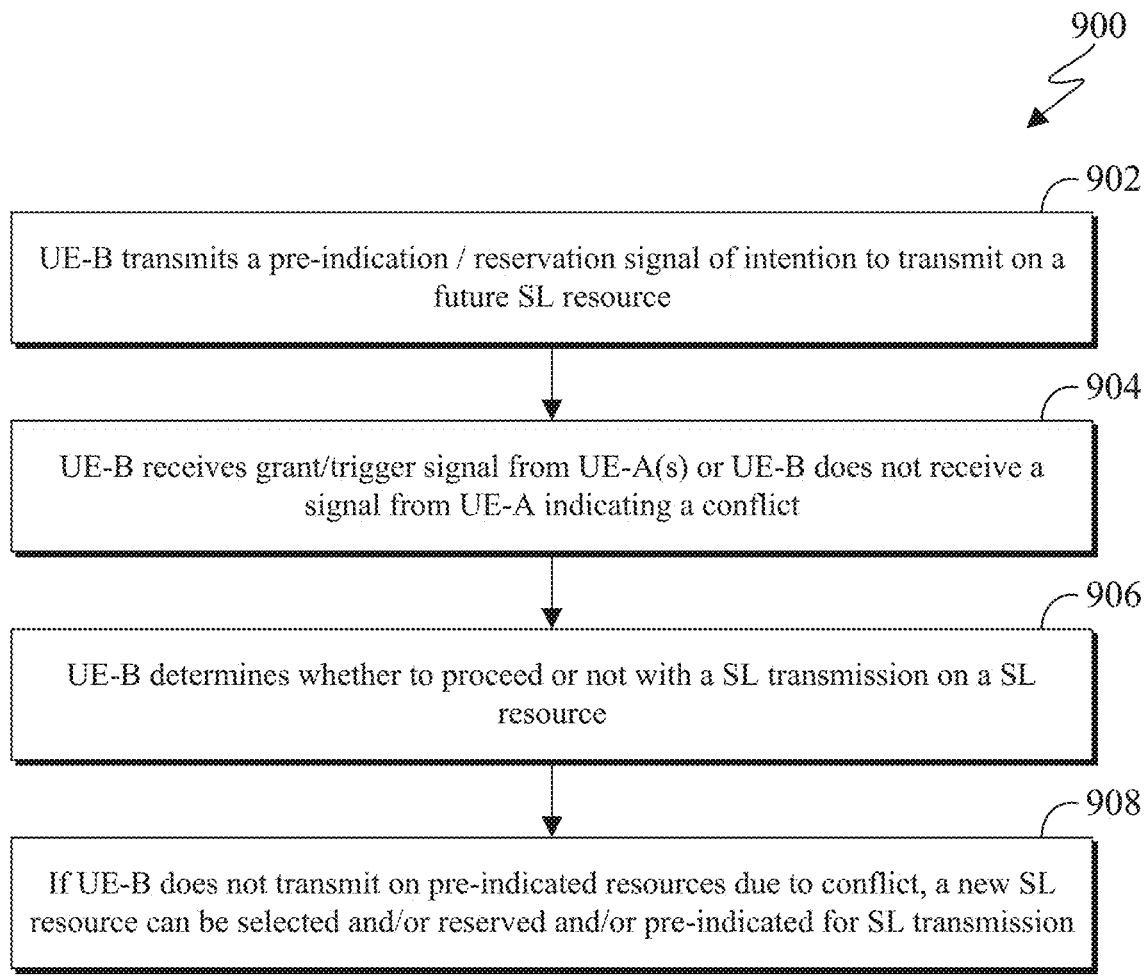

FIG. 7 illustrates a timeline 700 for a SL transmission on a future SL resource according to embodiments of present disclosure. FIGS. 8 and 9 illustrate example methods 800 and 900 for a user equipment (UE) according to embodiments of present disclosure. The steps of the method 800 and 900 can be performed by any of the UEs 111-116 of FIG. 1, such as the UE 116 of FIG. 3. The methods 800 and 900 of FIGS. 8 and 9 are for illustration only and other embodiments can be used without departing from the scope of the present disclosure.

The timeline 700 of FIG. 7 is for pre-indication/reservation and grant/trigger for a SL transmission on a future SL resource. The method 800 of FIG. 8 describes the procedure for UE-A while the method 900 of FIG. 9 describes a procedure for UE-B.

In step one, UE-B(s) select resources available for SL transmission, e.g. set A, for example this can be based on sensing performed at UE-B(s) and/or based on earlier inter-UE co-ordination information received at UE-B(s). UE-B(s) (e.g., UE-B1 and UE-B2) transmit a pre-indication/reservation signal of intention to transmit on a future SL resource (e.g., resource SL1, or set B) (step 902) and the UE-A(s) receive the pre-indication/reservation signal transmitted by UE-B(s) (step 802). Wherein set B can be set A or a subset of set A. This signal can include N resources. N is the size (cardinality) of set B.

Regarding step 902 (UE-B transmit a pre-indication/reservation signal), the pre-indication/reservation signal is similar to release 16 SL transmission. For example, a SL transmission includes a PSCCH+PSSCH with $1^{st}$ stage/part SCI in PSCCH, $2^{nd}$ stage part/SCI and SL shared channel in PSSCH. The Pt stage/part includes resources for the current transmission and up to 2 reserved resources for SL HARQ re-transmissions (e.g., N=1 or N=2)).

for another example, the pre-indication/reservation signal is similar to release 16 SL transmission, wherein a SL transmission includes a PSCCH+PSSCH with $1^{st}$ stage/part SCI in PSCCH, $2^{nd}$ stage part/SCI and SL shared channel in PSSCH. The $1^{st}$ stage/part includes resources for the current transmission and up to N reserved resources for SL transmissions. Wherein, the SL transmission can be a re-transmission of the same SL TB, or a transmission of new SL TB. In one example N=1. In one example, N=2. In another example, N is larger than 2 and specified in the system specification and/or pre-configured and/or configured or updated by RRC signaling and/or MAC CE signaling and/or L1 control signaling.

For yet another example, the pre-indication/reservation signal can be (i) a standalone first stage/part SCI, i.e., PSCCH without PSSCH, (ii) included in a second (or first) part/stage SCI with or without SL shared channel in the PSSCH, i.e., $1^{st}$ stage/part SCI+$2^{nd}$ stage/part with SL shared channel, or $1^{st}$ stage/part SCI+$2^{nd}$ stage/part with SL shared channel, and the pre-indication/reservation signal is included in $1^{st}$ stage/part SCI or $2^{nd}$ stage/part, (iii) a PSFCH like signal, (iv) a SL MAC CE, (v) a PC5 RRC, (vi) or a combination thereof. The pre-indication/reservation signal can include N reserved resources.

Step two is preformed after UE-A(s) performs inter-UE coordination based on the received pre-indication/reservation signal from one or multiple UE-B(s), wherein the received signal from a UE-B can include N pre-indicated/reserved SL resources. N can be the same or different for each UE-B. UE-A(s) determines preferred or non-preferred resource out of the N resources for each UE-B (see step 804). Non-preferred resources are resources that have a collision or conflict with another SL or UL transmission. For example, this can be based on a determination of overlap of a first pre-indicated or reserved SL resource with a second SL resource. The second SL resource can be (i) a pre-indicated or reserved resource of another UE, wherein overlap can be in time and frequency, (ii) based on sensing performed at UE-A, wherein overlap can be in time and frequency, (iii) a SL resource used for transmission from UE-A, in this case overlap can be in time domain.

Additionally, the second SL resource can be a SL resource that overlaps with an UL transmission such as (i) physical random access channel (PRACH) preamble for Type 1 and Type 2 Random access procedure, (ii) physical uplink shared channel (PUSCH) for Type 2 Random access procedure, (iii) message 3 RACH resources, (iv) physical uplink control channel (PUCCH) transmissions including UCI for the UE interface and/or SL HARQ-ACK feedback to network, (v) dynamically scheduled PUSCH transmission, (vi) configured grant Type 1 or Type 2 PUSCH transmission, (vii) SRS transmissions (periodic, semi-persistent and aperiodic), or (viii) the conflict (i.e., whether the resource is non-preferred or not) can be further determined based on the priority of the UL transmission and the priority of the SL transmission.

The second SL resource can be an NR SL resources that overlaps with an LTE SL transmission or reception. The conflict (i.e., whether the resource is non-preferred or not) can be further determined based on the priority of the LTE SL transmission or reception and the priority of the NR SL transmission.

UE-A can determine a preferred SL transmission on an overlapped or collided SL resource based on prioritization. Additionally, UE-A determines a preferred or non-preferred (a non-preferred SL resource is a SL resource with a detected conflict) SL resource based on the SL-RSRP, wherein the SL-RSRP can be measured using the PSCCH DMRS or the PSSCH DMRS. If a SL resource pre-indicate/reserved by UE-B overlaps or partially overlaps, in time and frequency domains, with a SL resource detected at UE-A (e.g., based on sensing at UE-A) and if; (1) Measured SL RSRP of the resource causing conflict is larger than (or larger than or equal to) the SL RSRP threshold. The SL resource pre-indicated/reserved by UE-B is in conflict, (2) Measured SL RSRP of the resource causing conflict is less than or equal to (or less than) the SL RSRP threshold. The SL resource pre-indicated/reserved by UE-B is not in conflict. Wherein, the SL RSRP threshold can depend on one or more of; (1) priority of UE-B's transmission, priority of the overlapping SL resource at UE-A. For example, the UE-A(s) transmits a grant/trigger signal indicating preferred and/or non-preferred resources to UE-B(s) (e.g., UE-B1 and UE-B2). For example, the preferred and/or non-preferred resources (resources with a conflict) can be for the set of N pre-indicated/reserved resources from UE-B. For another example, UE-A (s) transmits a grant/trigger signal indicating preferred and/or non-preferred resources to UE-B(s) (e.g., UE-B1 and UE-B2). For example, the preferred (e.g., without a conflict) and/or non-preferred resources (resources with a conflict) can be for the set of pre-indicated/reserved resources from UE-B. In one example, the absence of a signal indicating resources with conflict from UE-A at UE-B, indicates to UE-B that there is no conflict in the set of pre-indicated/reserved resources.

In step three the UE-B(s) (e.g., UE-B1 and UE-B2) determine whether to proceed or not with a SL transmission on a SL resource (see step 906). For example, if a pre-indicated/reserved resource is indicated as not being in conflict (e.g., preferred or available), SL transmission can proceed on such resource). If, UE-B(s) (e.g., UE-B1 and UE-B2) do not transmit on pre-indicated resources a new SL resource can be selected and/or reserved and/or pre-indicated for SL transmission by performing SL resource (re-) selection based on sensing performed at UE-B(s) and/or based on earlier inter-UE co-ordination information received at UE-B(s).

The method 800 of FIG. 8 and the method 900 of FIG. 9 describe the above three steps. For example, the method 800 is directed towards UE-A while the method 900 is directed towards the UE-B.

As illustrated in FIG. 8, in step 802 UE-A receives the pre-indication/reservation signal transmitted by UE(B). In step 804, the UE-A performs inter-UE coordination based on the received pre-indication/reservation signal of the one or more UE-B(s) (of steps 802 and 902), a UE-A sensing and UE-A SL transmission, and the like. For example, a UE-A determines preferred or non-preferred (conflict) resource for each UE-B. In step 806, UE-A transmits a grant/trigger indicating preferred and/or non-preferred resource to UE-B.

As illustrated in FIG. 9, in step 902, the UE-B transmits a pre-indication/reservation signal of intention to transmit on a future SL resource. In step 904, the UE-B receives a grant/trigger signal from UE-A (see step 806). In step 906, the UE-B determines whether to proceed with a SL transmission on a SL resource. In step 908, if the UE-B does not transmit on pre-indicated resources due to conflict, a new SL resource can be selected, reserved, pre-indicated, or a combination thereof for SL transmission.

Although FIGS. 8 and 9 illustrate the methods 800 and 900, respectively, various changes may be made to FIGS. 8 and 9. For example, while the method 800 of FIG. 8 and the method 900 of FIG. 9 are shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure describe a component 1 for PSFCH like pre-indication/reservation and grand/trigger signaling. The following examples and embodiments describe PSFCH like pre-indication/reservation and grand/trigger signaling.

In certain embodiments, the pre-indication/reservation signal can be a 1-bit signal per UE-B. A PSFCH-like channel or signal can be used for the pre-indication/reservation signal. A PSFCH-like channel can transmit two-logical values, e.g., logical 0 and logical 1. For example (example 1.1.1), the pre-indication/reservation of a SL transmission in a future SL resource can be indicated by one logical level of PSFCH (e.g., logical 1), and the absence of SL transmission in a future SL resource can be indicated by the other logical level of PSFCH (e.g., logical 0). For another example (example 1.1.2), the pre-indication/reservation of a SL transmission in a future SL resource can be indicated by a transmission of a PSFCH-like channel, and the absence of SL transmission in a future SL resource can be indicated by no transmission (i.e., discontinuous transmission (DTX)) of a PSFCH-like channel.

In certain embodiments, the grant/trigger signal can be a 1-bit signal per UE-B. A PSFCH-like (or feedback) channel or signal can be used for grant/trigger signal. A PSFCH-like (or feedback) channel can transmit two-logical values, e.g., logical 0 and logical 1. For example (example 1.2.1), the grant/trigger signal of a SL transmission in a SL resource can be indicated by one logical level of PSFCH (e.g., logical 1) when the SL transmission in that resource is preferred, and by the other logical level of PSFCH (e.g., logical 0) when SL transmission in that resource is not preferred. For another example (example 1.2.2), the grant/trigger signal of a SL transmission in a SL resource can be indicated by a transmission of a PSFCH-like (or feedback) channel when the SL transmission in that resource is preferred and can be indicated by no transmission (i.e., DTX) of a PSFCH-like (or feedback) channel when SL transmission in that resource is not preferred. For another example (example 1.2.3), the grant/trigger signal of a SL transmission in a SL resource can be indicated by no transmission (i.e., DTX) of a PSFCH-like (or feedback) channel when the SL transmission in that resource is preferred (e.g., no conflict detected), and can be indicated by a transmission of a PSFCH-like (or feedback) channel when SL transmission in that resource is not preferred (e.g., conflict detected).

For example (example 1.3.1), the SL slots can be partitioned into separate resource pools for SL data and for SL signaling. It is noted that SL data resource pool can be used to convey PSCCH, PSSCH and PSFCH transmissions and can have a slot structure similar to the structure of NR release 16 SL slot. SL signaling resource pool can be used to convey signaling information such as pre-indication/reservation singling and grant/trigger signaling.

Figure 10:
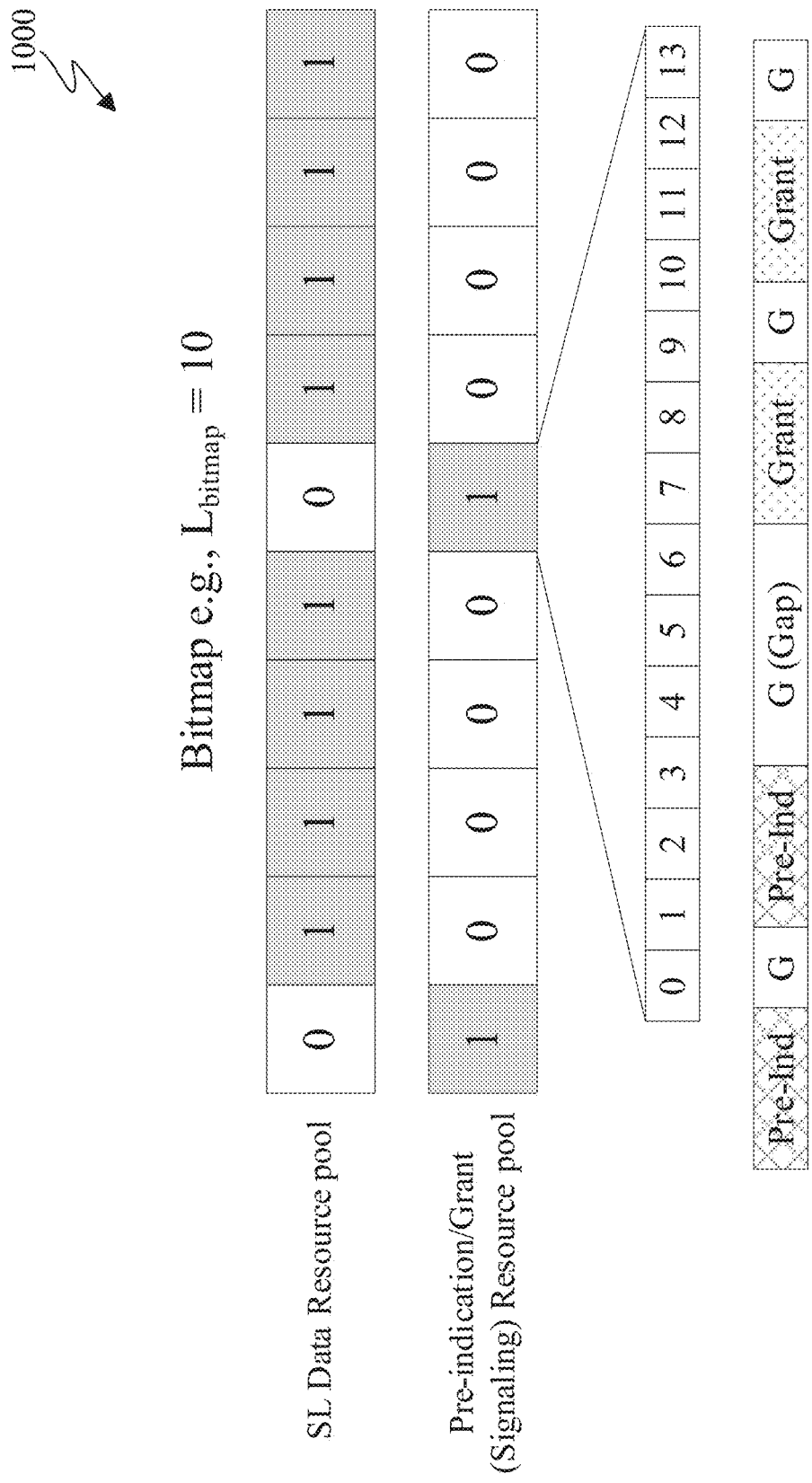
FIG. 10 illustrates an example of separate resource pools for SL data transmission and SL signaling according to embodiments of present disclosure.

FIG. 10 illustrates an example diagram 1000 of separate resource pools for SL data transmission and SL signaling according to embodiments of present disclosure. The diagram 1000 illustrates an example of separate resource pools for SL data transmission and SL signaling. In this example, the resource pools have a bitmap of size $L_{bitmap}=10$, wherein 2 slots are allocated to the signaling resource pool and 8 slots are allocated to the SL data resource pool.

The slot structure of the signaling resource pool can be such that, for one example (example 1.3.1.1), a SL slot can contain pre-indication/reservation singling and grant/trigger signaling, as illustrated in FIG. 10. The slot structure of the signaling resource pool can be such that, for one example (example 1.3.1.2), a SL slot can contain either pre-indication/reservation singling or grant/trigger signaling.

In one example, a PSFCH-like transmission or feedback channel includes an OFDM symbol, preceded by a duplicate of that OFDM symbol, and followed by a gap OFDM symbol. In general, a SL slot can be divided into M groups of K OFDM symbols, with each group of K OFDM symbols separated by a gap OFDM, with a gap OFDM symbol at the end of the SL slot. In one example, K can be 2 OFDM symbols for a PSFCH-like transmission or feedback channel, which includes the duplicate OFDM symbols and the PSFCH-like OFDM symbol. In one example, with 14 symbols in a SL slot, M can be 4 as illustrated in FIG. 10.

As discussed above in example 1.3.1.1, the M groups of OFDM symbols per slot can be used for pre-indication/reservation signaling as well as grant/trigger signaling, i.e., $M=M_1+M_2$, wherein $M_1$ OFDM symbol groups are for pre-indication/reservation signaling and $M_2$ OFDM symbol groups are for grant/trigger signaling. For the example as illustrated in FIG. 10, $M=4$, $M_1=2$ and $M_2=2$.

As discussed above in example 1.3.1.2, the M groups of OFDM symbols per slot can be used for either pre-indication/reservation signaling or grant/trigger signaling, i.e., $M=M_1=M_2$, wherein $M_1$ OFDM symbol groups are for pre-indication/reservation signaling and $M_2$ OFDM symbol groups are for grant/trigger signaling.

For each sub-channel of a slot of a SL data resource pool, two bits can exist in the corresponding sub-channel of the signaling resource pool. One bit can be for pre-indication/reservation signaling of the corresponding sub-channel and a second bit can be for grant/trigger signaling of the corresponding sub-channel, for each UE-B.

The number of signals that can be indicated by a slot of a signaling resource pool is described in Equation (4), below.

$$M \lambda N_{subCH} \times N_{subCHsize} \times L \qquad (4)$$

Here, M is the number of OFDM symbol groups for PSFCH-like transmissions or feedback channel. Additionally, $N_{subCH}$ is the number of sub-channels in a SL resource pool. $N_{subCHsize}$ is the size of the sub-channel in PRBs. L is the number of PSFCH-like resources in one PRB of a group of K symbols. For example L can equal 6, e.g., when there are 12 cyclic shifts in a PRB, and 2 cyclic shifts are allocated to each resource, e.g., one cyclic shift for logical 0, and the other cyclic shift for logical 1.

According to example 1.3.1.1, described above, the number of signals required for pre-indication/reservation signaling as well grant/trigger signaling for a group of $N_{UEB}$ UE-Bs is described in Equation (5), below.

$$2(\text{For pre\_indication/reservation as well as grant/trigger signaling}) \times N_{subCH} \times N_{SLData} \times N_{UEB} \qquad (5)$$

Where, $N_{SLData}$ is the number of SL slots of a SL data resource pool associated with a signaling slot. $N_{UEB}$ is the number of UEs that can transmit/receive pre_indication/reservation and/or grant/trigger signaling.

Figure 11:
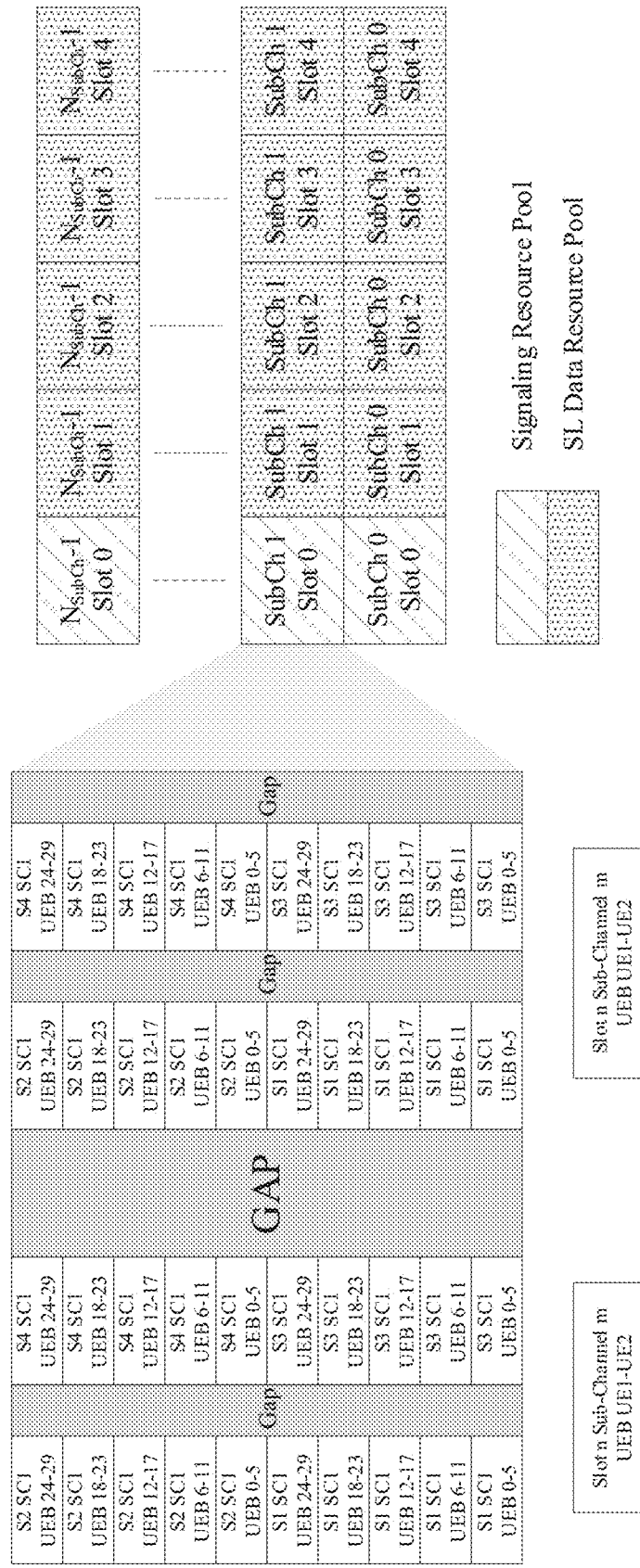
FIG. 11 illustrates an example for mapping signaling resources to SL slots of a SL data resource pool according to embodiments of present disclosure.

The mapping of signaling resources to SL slots of a SL data resource pool and UE-B(s) can be performed within each sub-channel as indicated in FIG. 11. There are various ways to determine the order of mapping signaling resources to SL slots of a SL data resource pool and UE-B(s).

FIG. 11 illustrates an example mapping diagram 1100 for mapping signaling resources to SL slots of a SL data resource pool according to embodiments of present disclosure.

In one example, according to the example of FIG. 11, the mapping order for SL resources of a slot of a signaling resource pool is in order of First in increasing order of resource within a PRB of a group of K OFDM symbols. Then in increasing order of PRB within a group of K OFDM symbols. Finally, in increasing order (in time) of a group of K OFDM symbols.

The mapping of SL slots of a SL data resource pool associated with a signaling slot and UE-B(s) can be according to the following example. In this example, The first $M_1$ group of K OFDM symbols can be allocated to pre-indication/reservation signaling, and the last $M_2$ group of K OFDM symbols can be allocated to grant/trigger signaling. Within each group the order can be, first, in increasing order of UE-B index, and second, in increasing order of SL slot index within the SL slots of a SL data resource pool associated with a signaling slot.

As illustrated, FIG. 11 is a mapping example with M=4, $M_1$=2, $M_2$=2, $N_{subChsize}$=10, L=6 and $N_{UEB}$=30.

For example (example 1.3.2), the SL slots of SL resource pool can be used for both SL signaling as well as SL data transmission.

In certain embodiments, a UE-B can receive the grant/trigger signaling intended to that UE-B, a UE-B could also receive the grant/trigger signaling of other UE-Bs, and take that into account when making a decision on transmission on a SL resource.

Embodiments of the present disclosure describe a component 2 for PSCCH pre-indication/reservation and grand/trigger signaling. The following examples and embodiments describe PSCCH pre-indication/reservation and grand/trigger signaling.

The pre-indication/reservation signal can be included in PSCCH transmission. For example (example 2.1.1), the PSCCH transmission is associated with a PSSCH transmission in a same SL slot. The PSCCH includes SCI that indicates the SL resources of the SL transmission on PSSCH in the current SL slot as well SL resources reserved in a future SL slot, wherein the reserved resource(s) can be for a retransmission of the current transmission (if needed or if applicable) and/or the reserved resource(s) can be for a new transmission. For example, the number of SL resources reserved is N. In one example N=1, in another example N=2, in yet another example N>2 and is specified in system specifications and/or configured or updated by RRC signaling and/or MAC CE signaling and/or L1 control signaling.

For another example (example 2.1.2), the PSCCH transmission is not associated with a PSSCH transmission in a same SL slot. The PSCCH includes SCI that indicates SL resources reserved in a future SL slot. For example, the number of SL resources reserved is N. In one example N=1, in another example N=2, in yet another example N>2 and is specified in system specifications and/or configured or updated by RRC signaling and/or MAC CE signaling and/or L1 control signaling.

The grant/trigger signal can be included in PSCCH or PSSCH transmission from UE-A(s) to UE-B(s). For example (example 2.2.1), a PSCCH transmission is not associated with a PSSCH transmission in a same SL slot. The PSCCH includes SCI that indicates SL resources, previously pre-indicated or reserved, granted/triggered for a SL transmission (preferred SL resources).

For another example (example 2.2.2), a PSCCH transmission is not associated with a PSSCH transmission in a same SL slot. The PSCCH includes SCI that indicates SL resources, previously pre-indicated or reserved, not preferred for SL transmission.

For another example (example 2.2.3), a PSSCH transmission (SL data or SL MAC CE or second stage SCI) includes the grant/trigger signaling. The PSSCH transmission indicates SL resources, previously pre-indicated or reserved, granted/triggered for a SL transmission (preferred SL resources).

For another example (example 2.2.4), a PSSCH transmission (SL data or SL MAC CE or second stage SCI) includes the grant/trigger signaling. The PSSCH indicates SL resources, previously pre-indicated or reserved, not preferred for SL transmission.

For another example (example 2.2.5), a PSCCH transmission can be associated with a PSSCH transmission in a same SL slot. The PSCCH includes SCI that indicates SL resources, previously pre-indicated or reserved, granted/triggered for a SL transmission (preferred SL resources).

For yet another example (example 2.2.6), a PSCCH transmission can be associated with a PSSCH transmission in a same SL slot. The PSCCH includes SCI that indicates SL resources, previously pre-indicated or reserved, not preferred for SL transmission.

For yet another example (example 2.2.7), the granted/triggered resources are conveyed in an N-bit bitmap, with one-bit corresponding to each one of the N per-indicated/reserved SL resources. If a per-indicated/reserved SL resource has no conflict (e.g., preferred or available) a logical level is set for the corresponding bit (e.g., logical level 1 or logical level 0). If a per-indicated/reserved SL resource has conflict (e.g., non-preferred or not available) a different logical level is set for the corresponding bit (e.g., logical level 0 or logical level 1).

Figure 12:
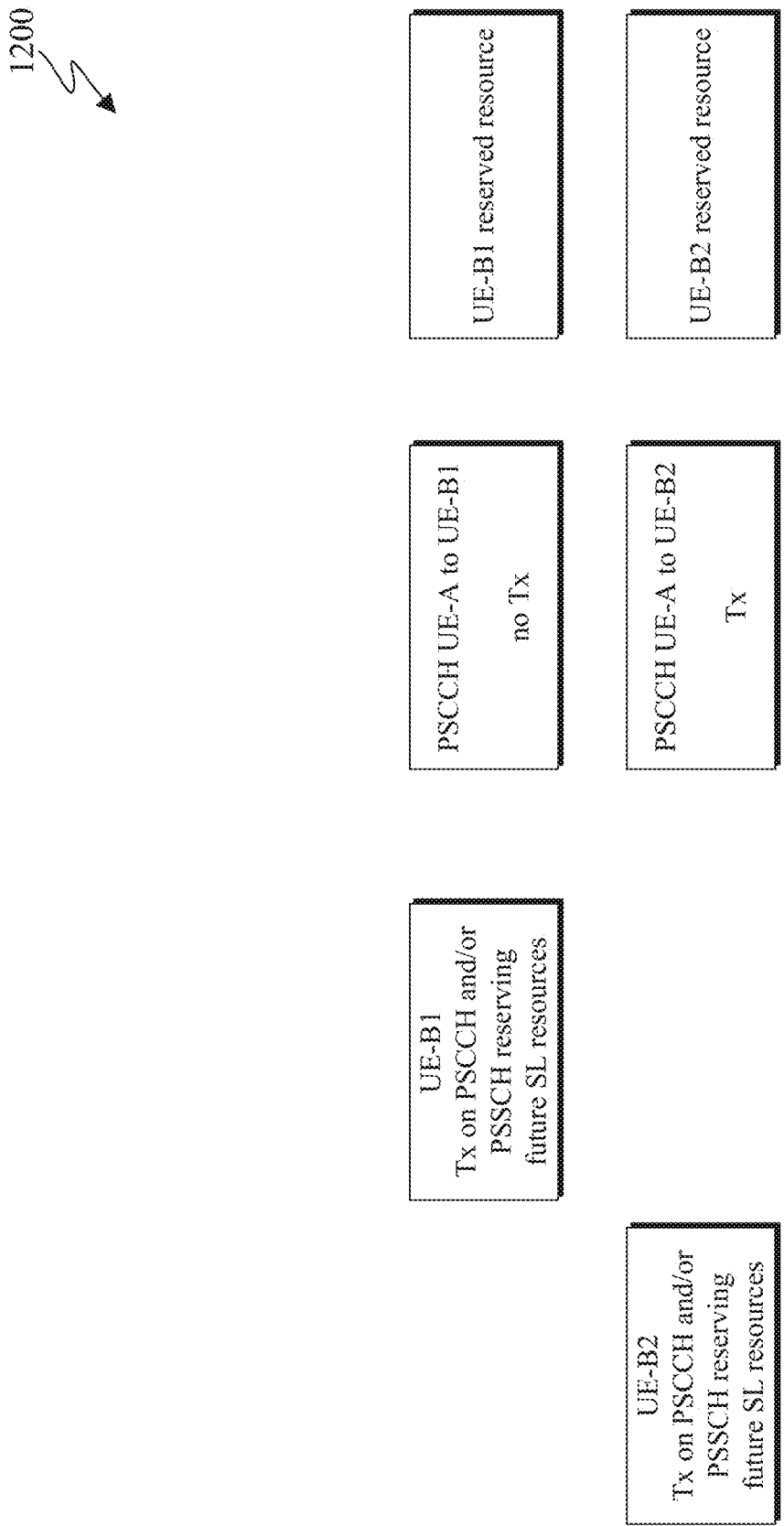
FIG. 12 illustrates an example signaling using a physical sidelink control channel (PSCCH) according to embodiments of present disclosure.

FIG. 12 illustrates an example signaling diagram 1200 using physical sidelink control channel (PSCCH) according to embodiments of present disclosure. In particular, FIG. 12 illustrates an example pre-indication/reservation signaling and grant/trigger signaling using PSCCH. In this example, there are two UE-Bs. UE-B1 and UE-B1 pre-indicate or reserve a future SL resource for SL transmission using PSCCH. The UE-A can be the intended receiver of the UE-B1 and UE-B2 transmissions, or just the intended receiver of the UE-B1 or UE-B2 transmissions. UE-A performs inter-UE coordination, if the SL resources indicated by UE-B1 and UE-B2 overlap in time and frequency domains (partially and/or fully) or collide, UE-A can indicate using grant/triggering signaling whether the SL resource is preferred or not preferred to each UE-B. For example, the reserved SL resource of UE-B1 can be indicated as preferred and the reserved SL resource of UE-B2 can be indicated as non-preferred or vice versa. Additionally or alternatively, the collision or overlap in time and frequency domains of a pre-indicated or reserved SL resource can be with a SL resource based on the sensing at UE-A (e.g., checking whether a resource is reserved due to a decoded SCI with a SL RSRP that exceeds a threshold), wherein UE-A can indicate using grant/triggering signaling whether the SL resource is preferred or not preferred to each UE-B. A conflict due to sensing can take into account the SL RSRP of the SL resources involved in the collision for determining whether a pre-indicated/reserved SL resource from UE-B has a conflict, as described earlier in this disclosure. A conflict determination can also take into account the priority levels of the SL transmissions associated with the SL resources involved in the collision. Additionally or alternatively, the collision or overlap of a pre-indicated or reserved SL resource can be with SL resource used by UE-A for its SL transmission, the overlap in this case can just be in time domain, wherein UE-A can indicate using grant/triggering signaling whether the SL resource is preferred or not preferred to each UE-B. When UE-B(s) decides transmission on reserved SL resource, it can take this signaling into account.

In certain embodiments, a UE-B can receive the grant/trigger signaling intended to that UE-B, a UE-B could also receive the grant/trigger signaling of other UE-Bs, and take that into account when making a decision on transmission on a SL resource. UE-B selects a pre-indicated/reserved SL resource that has no conflict indicated from UE-A. If there is no pre-indicated/reserved SL resource UE-B preforms resource (re-)selection to select a SL resource taking into account its own sensing results and/or any inter-UE coordination information from other UEs.

Embodiments of the present disclosure describe a component 3 for mixed PSFCH-like (or feedback channel) and PSCCH pre-indication/reservation and grant/trigger signaling. The following examples and embodiments describe mixed PSFCH-like (or feedback channel) and PSCCH pre-indication/reservation and grant/trigger signaling.

In this component (component 3), pre-indication/reservation signaling can be included in a PSCCH transmission, and grant/trigger signaling can be included in a PSFCH-like transmission or feedback channel. Alternatively, pre-indication/reservation signaling can be included in a PSFCH-like transmission or feedback channel, and grant/trigger signaling can be included in a PSSCH transmission.

For example (example 3.1), the pre-indication/reservation signal can be included in PSCCH transmission, and the grant/trigger signaling can be included in a PSFCH-like transmission or feedback channel. UE-B pre-indicates/reserves N SL resources using PSCCH. UE-A indicates conflicting SL resources and/or available SL resource using grant/trigger signaling. That is (example 3.1.1), the PSCCH transmission is associated with a PSSCH transmission in a same SL slot. The PSCCH includes SCI that indicates the SL resources of the SL transmission on PSSCH in the current SL slot as well N SL resources reserved in a future SL slot, wherein the reserved resource(s) can be for a retransmission of the current transmission (if needed or if applicable) and/or the reserved resource(s) can be for a new transmission.

For instance (example 3.1.1.1), a UE-A transmits HARQ-ACK feedback on PSFCH in response to a PSCCH/PSSCH transmission in a SL slot, and the pre-indicated/reserved resource can be for a retransmission of the current transmission. A UE-A can transmit positive acknowledgment (ACK) on PSFCH if the PSSCH transmission is successfully decoded. If the PSSCH transmission is not successfully decoded, a UE-B can retransmit on a pre-indicated/reserved resource if UE-A determines that it is available.

If UE-A determines that the pre-indicated or reserved SL resource does not overlap or collide in time and frequency domains with a second SL transmission, or if the pre-indicated or reserved SL resource collides or overlaps in time and frequency domains with a second SL transmission, but has the highest priority and/or the highest SL RSRP and/or SL RSRP above a threshold, wherein a second SL transmission can be determined from a pre-indication/reserved signal(s) received by UE-A and/or UE-A's sensing information and/or UE-A's own SL transmission (with overlap in time with the pre-indicated/reserved resource of UE-B). A conflict due to sensing can take into account the SL RSRP of the SL resources involved in the collision for determining whether a pre-indicated/reserved SL resource from UE-B has a conflict, as described earlier in this disclosure. UE-A can indicate to UE-B a negative acknowledgement (NACK) for retransmission and indicate to UE-B that the pre-indicated/reserved resource is preferred for SL transmission, e.g., that the pre-indicated/reserved resource has no conflict.

Alternatively, If UE-A determines that the pre-indicated or reserved SL resource collides or overlaps in time and frequency domains with another SL transmission, but has a lower priority and/or lower SL RSRP than any of the colliding SL transmissions and/or SL RSRP below a threshold, wherein a colliding SL transmission can be determined from a pre-indication/reserved signal(s) received by UE-A and/or UE-A's sensing information and/or UE-A's own SL transmission (with overlap in time with the pre-indicated/reserved resource of UE-B). UE-A can indicate to UE-B a negative acknowledgement (NACK) for retransmission and indicate to UE-B that the pre-indicated/reserved resource is not preferred (e.g., has a conflict) for SL transmission. UE-B can reselect a different resource for SL transmission based on its own sensing and/or inter-UE co-ordination information from other UEs.

If the pre-indication/reservation signal from UE-B to UE-A includes more than one (e.g., N, with N>1) resource, UE-A can determine a single outcome for that status of the N pre-indicated/reserved resource. According to one of the following; (1) If any resource pre-indicated/configured SL resource has a conflict, UE-A indicates to UE-B resources have a conflict (e.g., not preferred), else (all pre-indicated/configured SL resources have no conflict) UE-A indicates to UE-B resources have no conflict (e.g., preferred). (2) If all pre-indicated/configured SL resources have a conflict, UE-A indicates to UE-B resources have a conflict (e.g., not preferred), else (at least one pre-indicated/configured SL resource has no conflict) UE-A indicates to UE-B resources have no conflict (e.g., preferred). (3) If first in-time pre-indicated/configured SL resource has a conflict, UE-A indicates to UE-B resources have a conflict (e.g., not preferred), else (first in-time pre-indicated/configured SL resource has no conflict) UE-A indicates to UE-B resources have no conflict (e.g., preferred).

In this example (example, 3.1.1.1) the PSFCH-like (or feedback) channel or signal can indicate one of three levels, that of (i) ACK for successful reception of PSSCH, (ii) NACK (failed reception of PSSCH) and transmission on pre-indicated/reserved resource(s) is preferred (e.g., no conflict detected on reserved resource), or (iii) NACK (failed reception of PSSCH) and transmission on pre-indicated/reserved resource(s) is not preferred (e.g., with conflict detected on reserved resource).

In certain embodiments (denoted as Option 1), for a PSFCH with three levels, 2-bit PSFCH, e.g., a PSFCH design with 4 cyclic shifts allocated to each resource. In this case, a PSFCH design with 3 cyclic shifts allocated to each resource is also feasible, as there are three levels to be indicated.

FIGS. 13A-13F illustrate example PSFCH-like signaling or feedback channel according to embodiments of present disclosure.

FIG. 13A illustrates a PSFCH signaling design 1300a, e.g., for unicast HARQ-ACK feedback and Groupcast HARQ-ACK reporting option (2), wherein for a two-bit PSFCH resource $m_{cs}=6$ indicates ACK, $m_{cs}=0$, indicates NACK with retransmission on reserved resource preferred (e.g., no conflict detected on reserved resource), and $m_{cs}=3$, indicates a NACK with retransmission on reserved resource not preferred (e.g., conflict detected on reserved resource) ($m_{cs}=9$ can be used instead of $m_{cs}=3$).

In a variant of FIG. 13A, the cyclic shifts used can be $m_{cs}=0$ for NACK with preferred resource (i.e., no conflict detected on reserved resource), $m_{cs}=4$ for NACK with non-preferred resource (i.e., conflict detected on reserved resource) and $m_{cs}=8$ for ACK.

Figure 13B:
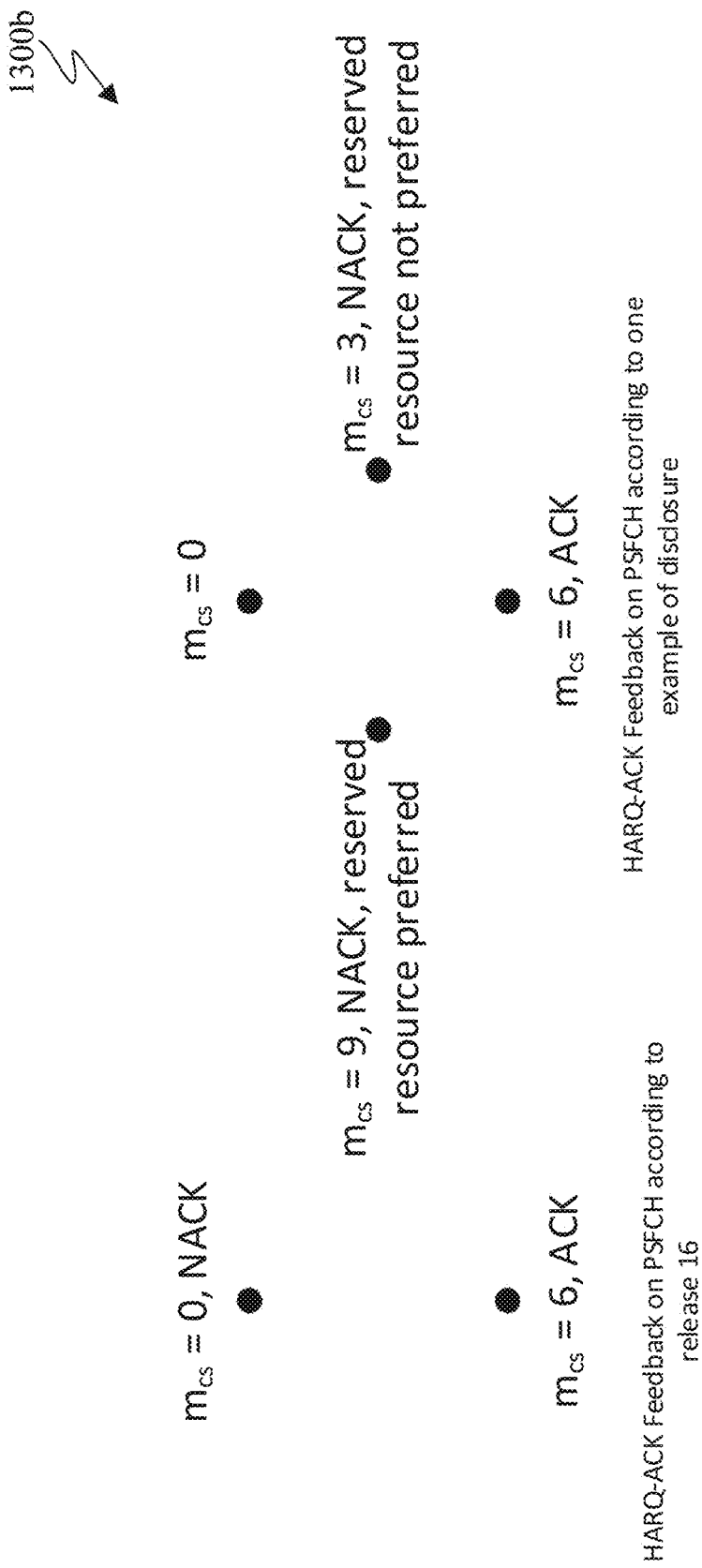

FIG. 13B illustrates a PSFCH signaling design 1300b, e.g., for unicast HARQ-ACK feedback and Groupcast HARQ-ACK reporting option (2), wherein for a two-bit PSFCH resource $m_{cs}=6$ indicates ACK, $m_{cs}=9$, indicates NACK with retransmission on reserved resource preferred (e.g., no conflict detected on reserved resource), and $m_{cs}=3$, indicates a NACK with retransmission on reserved resource not preferred (e.g., conflict detected on reserved resource) (the role of $m_{cs}=9$ and $m_{cs}=3$ can be switched). $m_{cs}=0$ can be used by UEs not implementing the scheme described in example 3.1 to indicate a NACK, this allows co-existence of older UEs not implementing this scheme and newer UEs implementing the scheme described in example 3.1, above.

FIG. 13C illustrates a PSFCH signaling design 1300c, e.g., for Groupcast HARQ-ACK reporting option (1), wherein for a two-bit PSFCH resource $m_{cs}=0$, indicates NACK with retransmission on reserved resource preferred (e.g., no conflict detected on reserved resource), and $m_{cs}=3$, indicates a NACK with retransmission on reserved resource not preferred (e.g., no conflict detected on reserved resource) ($m_{cs}=9$ can be used instead of $m_{cs}=3$). There is no ACK feedback with Groupcast HARQ-ACK reporting option (1).

In a variant of FIG. 13C, the cyclic shifts used can be $m_{cs}=0$ for NACK with preferred resource (e.g., no conflict detected on reserved resource), $m_{cs}=6$ for NACK with non-preferred resource (e.g., conflict detected on reserved resource).

Figure 13D:
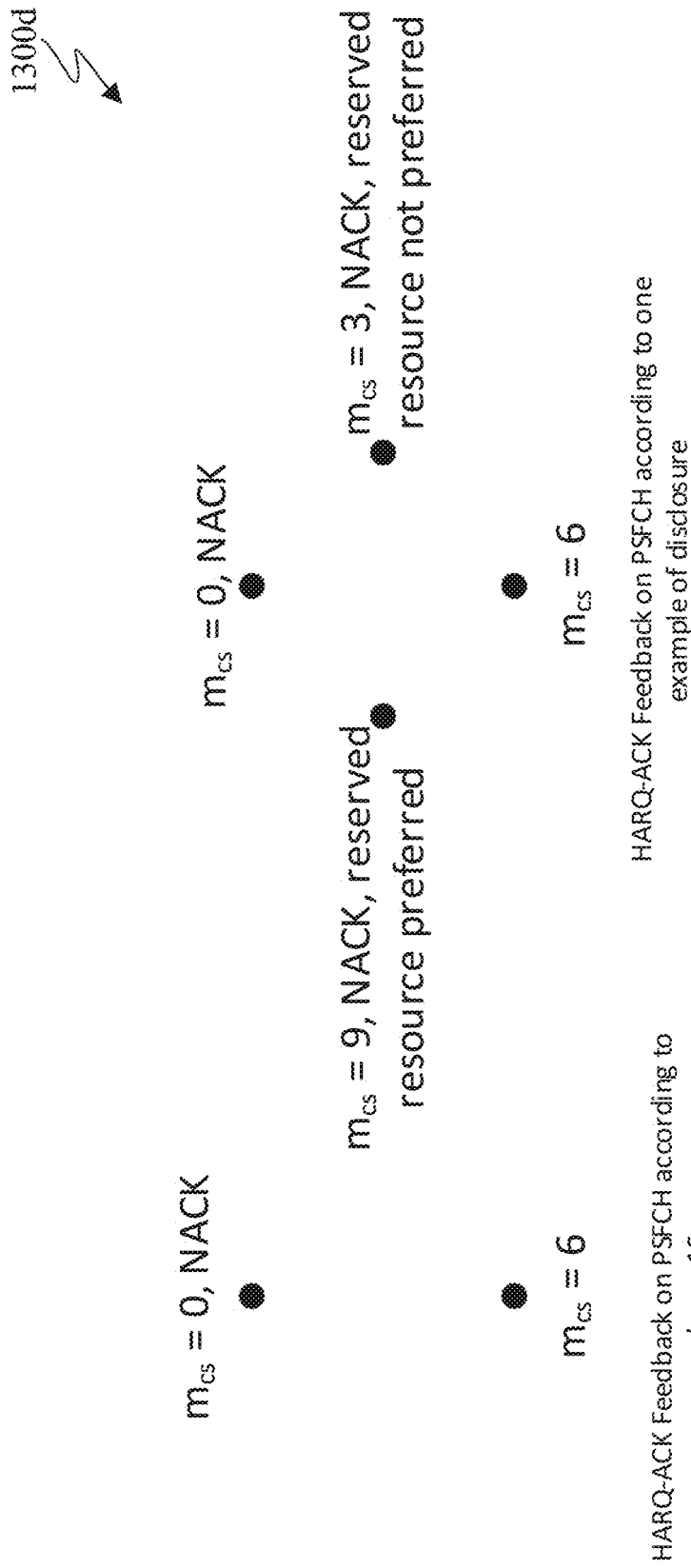

FIG. 13D illustrates a PSFCH signaling design 1300d, e.g., for Groupcast HARQ-ACK reporting option (1), wherein for a two-bit PSFCH resource $m_{cs}=9$, indicates NACK with retransmission on reserved resource preferred (e.g., no conflict detected on reserved resource), and $m_{cs}=3$, indicates a NACK with retransmission on reserved resource not preferred (e.g., conflict detected on reserved resource) (the role of $m_{cs}=9$ and $m_{cs}=3$ can be switched). $m_{cs}=0$ can be used by UEs not implementing the scheme described in example 3.1 to indicate a NACK, this allows co-existence of older UEs not implementing this scheme and newer UEs implementing the scheme described in example 3.1. There is no ACK feedback with Groupcast HARQ-ACK reporting option (1).

In certain embodiments (denoted as option 2), 2 1-bit PSFCH (or feedback channel) resources are allocated to a UE.

A first PSFCH resource can indicate the HARQ-ACK feedback. This resource can be common with UEs not implementing the scheme described in example 3.1. A second PSFCH resource can be used to indicate whether a reserved resource is preferred (e.g., no conflict detected on reserved resource) or not (e.g., conflict detected on reserved resource) for a pre-indicated/reserved SL resource. For example, logical 1 one can indicate that a reserved resource is preferred (e.g., no conflict detected on reserved resource), and logical 0 can indicate that a reserved resource is not preferred (e.g., conflict detected on reserved resource), or vice versa. Option 2 includes the following sub-options.

A first sub-option is denoted as Option 2-1 (e.g., for Unicast and Groupcast HARQ-ACK reporting option (2)). In case of ACK, indicate ACK on the first PSFCH resource, no transmission on the second PSFCH-like (feedback channel) resource. In case of NACK and reserved resource is preferred (e.g., no conflict detected on reserved resource), indicate NACK on the first resource, and indicate reserved resource is preferred on the second resource. In case of NACK and reserved resource is not preferred (e.g., conflict detected on reserved resource), indicate NACK on the first resource, and indicate reserved resource is not preferred on the second resource. This option requires 2 PSFCH transmissions and/or feedback channels in case of NACK. This scheme can be extended to indicate the conflict status for each of N pre-indicated/reserved SL resources by having a PSFCH-like (feedback channel) for each pre-indicated/reserved SL resource in addition to the PSFCH for HARQ-ACK status. Therefore, there can be a total of N+1 PSFCH (and/or feedback channel) resources. Alternatively, the conflict status for the N pre-indicated/reserved SL resources can be indicated using a single PSFCH-like (feedback channel) resource conveying one bit as described earlier, in this case only 2 PSFCH (and/or feedback channel) resources are needed. Alternatively, the N PSFCHes (feedback channels) can be replaced by one PSFCH-like (feedback channel) carrying N bits.

A second sub-option is noted as Option 2-2 (e.g., for Unicast and Groupcast HARQ-ACK reporting option (2)). In case of ACK, indicate ACK on the first PSFCH resource, no transmission on the second PSFCH-like (feedback channel) resource. In case of NACK and reserved resource is preferred (e.g., no conflict detected on reserved resource), no transmission on the first resource (DTX), and indicate reserved resource is preferred on the second resource. In case of NACK and reserved resource is not preferred, no transmission on the first resource (DTX), and indicate reserved resource is not preferred on the second resource (i.e., conflict detected on reserved resource). This option requires 1 PSFCH (and/or feedback channel) transmission in all cases. A UE not implementing this scheme and receiving PSFCH (feedback channel) transmissions, when it receives DTX on the first PSFCH resource from a UE implementing this scheme indicating a NACK, interprets the DTX as NACK and retransmits. A UE implementing this scheme and receiving PSFCH transmissions and/or feedback channels, when it receives a NACK from a UE not implementing this scheme on a first PSFCH resource can retransmit on a reserved resource, a UE not implementing this scheme and transmitting PSFCH does not check if the pre-indicated/ reserved resource is preferred or not. This scheme can be extended to indicate the conflict status for each of N pre-indicated/reserved SL resources by having a PSFCH-like (or feedback channel) for each pre-indicated/reserved SL resource in addition to the PSFCH for HARQ-ACK status. Therefore, there can be a total of N+1 PSFCH (and/or feedback channel) resources. Alternatively, the conflict status for the of N pre-indicated/reserved SL resources can be indicated using a single PSFCH (or feedback channel) resource conveying one bit as described earlier, in this case only 2 PSFCH (and/or feedback channel) resources are needed. In case of ACK only one PSFCH is transmitted in case of NACK N PSFCHes (feedback channels) are transmitted. Alternatively, the N PSFCHes can be replaced by one PSFCH-like (feedback channel) carrying N bits.

A third sub-option is noted as Option 2-3 (e.g., for Unicast and Groupcast HARQ-ACK reporting option (2)). In case of ACK, indicate ACK on the first PSFCH resource, no transmission on the second PSFCH (feedback channel) resource. In case of NACK and reserved resource is preferred (e.g., no conflict detected on reserved resource), indicate NACK on the first resource, this also indicates that the reserved resource is preferred, no transmission on the second resource. In case of NACK and reserved resource is not preferred (e.g., conflict detected on reserved resource), no transmission on the first resource (DTX), and indicate reserved resource is not preferred on the second resource. This option requires 1 PSFCH (or feedback channel) transmission in all cases. A UE not implementing this scheme and receiving PSFCH transmissions, when it receives DTX on the first PSFCH resource from a UE implementing this scheme indicating a NACK and reserved resources not preferred, interprets the DTX as NACK and retransmits. A UE implementing this scheme and receiving PSFCH transmissions, when it receives a NACK from a UE not implementing this scheme on a first PSFCH resource can retransmit on a reserved resource, a UE not implementing this scheme and transmitting PSFCH does not check if the pre-indicated/reserved resource is preferred or not.

It is noted that in option 2-2, a UE implementing this scheme and receiving a NACK on the first PSFCH resource, will be able to determine that the NACK is from a UE not implementing the scheme described in example 3.1, and can perform additional evaluation on the reserved resource, while in option 2-3, a UE implementing this scheme and receiving a NACK on the first PSFCH resource, will not know if this is from a UE implementing the scheme described in example 3.1 or not.

A fourth sub-option is noted as Option 2-4 (single PSFCH resource) (e.g., for Unicast and Groupcast HARQ-ACK reporting option (2)). In case of ACK, indicate ACK on the first PSFCH resource, no transmission on the second PSFCH resource. In case of NACK and reserved resource is preferred (e.g., no conflict detected on reserved resource), indicate NACK on the first resource, this also indicates that the reserved resource is preferred, no transmission on the second resource. In case of NACK and reserved resource is not preferred (e.g., conflict detected on reserved resource), no transmission on the first resource (DTX), no transmission on second resource. This option requires 1 PSFCH resource with no more than one PSFCH transmission in all cases. A UE not implementing this scheme and receiving PSFCH transmissions, when it receives DTX on the first PSFCH resource from a UE implementing this scheme indicating a NACK and reserved resources not preferred, interprets the DTX as NACK and retransmits. A UE implementing this scheme and receiving PSFCH transmissions, when it receives a NACK from a UE not implementing this scheme on a first PSFCH resource can retransmit on a reserved resource, a UE not implementing this scheme and transmitting PSFCH does not check if the pre-indicated/reserved resource is preferred or not. A UE implementing this scheme and receiving PSFCH transmissions, when it receives DTX on the first PSFCH resource, it could assume that the DTX is an indication of a non-preferred pre-indicated/reserved resource (e.g., a resource that has a collision or conflict), however, it will not be able to distinguish a DTX due to a non-preferred pre-indicated/reserved resource from a DTX due to a UE that should have transmitted a PSFCH and did not transmit the PSFCH due to non-reception of a corresponding PSCCH.

A fifth sub-option is noted as Option 2-5 (e.g., for Groupcast HARQ-ACK reporting option (1)). In case of NACK and reserved resource is preferred (e.g., no conflict detected on reserved resource), indicate NACK on the first resource, and indicate reserved resource is preferred on the second resource. In case of NACK and reserved resource is not preferred (e.g., conflict detected on reserved resource), indicate NACK on the first resource, and indicate reserved resource is not preferred on the second resource. This option requires 2 PSFCH (and/or feedback channel) transmissions in case of NACK. There is no ACK feedback with Groupcast HARQ-ACK reporting option (1). In this option, a UE implementing this scheme that receives a PSFCH on a first resource with NACK, and does not receive a PSFCH (feedback channel) on a second resource, can be an indication that the NACK on the first PSFCH resource is from a UE not implementing this scheme, additional evaluation can be done before retransmitting on the pre-indicated/reserved resource. A UE implementing this scheme that receives a PSFCH on a first resource with NACK, and receives a second PSFCH (feedback) indicating preferred or non-preferred pre-indicated/reserved resources (e.g., a resource that has a collision or conflict), if any UE indicates non-preferred pre-indicated/reserved resource a UE receiving the indication can re-selected a different SL resource (e.g., based on that UE's sensing and/or inter-UE coordination information from other UEs), otherwise the UE receiving the indication can use reserved resource. This scheme can be extended to indicate the conflict status for each of N pre-indicated/reserved SL resources by having a PSFCH (feedback channel) for each pre-indicated/reserved SL resource in addition to the PSFCH for HARQ-ACK status. Therefore, there can be a total of N+1 PSFCH (and/or feedback channel) resources. Alternatively, the conflict status for the of N pre-indicated/reserved SL resources can be indicated using a single PSFCH (feedback channel) resource conveying one bit as described earlier, in this case only 2 PSFCH (and/or feedback channel) resources are needed. Alternatively, the N PSFCHes (feedback channels) can be replaced by one PSFCH (feedback channel) carrying N bits.

A sixth sub-option is noted as Option 2-6 (e.g. for Groupcast HARQ-ACK reporting option (1)). In case of NACK and reserved resource is preferred (e.g., no conflict detected on reserved resource), indicate NACK on the first resource, this also indicates that the reserved resource is preferred, no transmission on the second resource. In case of NACK and reserved resource is not preferred (e.g., conflict detected on reserved resource), no transmission on the first resource (DTX), and indicate reserved resource is not preferred on the second resource. This option requires 1 PSFCH transmission in case of NACK. There is no ACK feedback with Groupcast HARQ-ACK reporting option (1).

In case of Groupcast HARQ-ACK Feedback, the PSFCH resource indicating preferred (e.g., no conflict detected on reserved resource) or non-preferred pre-indicated/reserved resource (e.g., a resource that has a collision or conflict) can be in a first example UE specific, or it can be in a second example UE-common (i.e., one resource for all UEs in the groupcast set). When the UE is transmitting feedback to indicate preferred (e.g., no conflict detected on reserved resource) or non-preferred (e.g., conflict detected on reserved resource) pre-indicated/reserved resource, it can in a first example transmit a logical level for a preferred pre-indicated/reserved resource and transmit a second logical level for non-preferred pre-indicated/reserved resource; or in a second example it can transmit a signal for a preferred pre-indicated/reserved resource and no transmission (DTX) for non-preferred pre-indicated/reserved resource; or in a third example it can transmit a signal for a non-preferred pre-indicated/reserved resource and no transmission (DTX) for a preferred pre-indicated/reserved resource.

In certain embodiments (denoted as Option 3), a PSFCH has 2 cyclic shifts. For indication of value 1, a transmit occurs on first cyclic shift only. For indication of value 2, a transmit occurs on second cyclic shift only. For indication of value 3, a transmit on occurs both cyclic shifts.

For example (example 3.1.1.2), a UE-A transmits HARQ-ACK feedback on PSFCH in response to a PSCCH/PSSCH transmission in a SL slot, and the pre-indicated/reserved resource can be for a retransmission of the current transmission and/or a new transmission. A UE-A can transmit positive acknowledgment (ACK) on PSFCH if the PSSCH transmission is successfully decoded. A UE-A can transmit negative acknowledgment (NACK) on PSFCH if the PSSCH transmission is not successfully decoded. UE-A can transmit an additional indication whether a pre-indicated/reserved resource is available (e.g., no conflict detected on reserved resource) or not available (e.g., conflict detected on reserved resource).

It is noted that if UE-A determines that the pre-indicated or reserved SL resource does not overlap or collide in time and frequency domains with a second SL transmission, or if the pre-indicated or reserved SL resource collides or overlaps in time and frequency domains with a second SL transmission, but has the highest priority and/or the highest SL RSRP and/or SL RSRP above a threshold, wherein a second SL transmission can be determined from a pre-indication/reserved signal(s) received by UE-A and/or UE-A's sensing information and/or UE-A's own SL transmission (with overlap in time with the pre-indicated/reserved resource of UE-B). A conflict due to sensing can take into account the SL RSRP of the SL resources involved in the collision for determining whether a pre-indicated/reserved SL resource from UE-B has a conflict, as described earlier in this disclosure. UE-A can indicate to UE-B that the pre-indicated/reserved resource is preferred for SL transmission, e.g., that the pre-indicated/reserved resource has no conflict.

Alternatively, if UE-A determines that the pre-indicated or reserved SL resource collides or overlaps in time and frequency domains with another SL transmission, but has a lower priority and/or lower SL RSRP than any of the colliding SL transmissions and/or SL RSRP below a threshold, wherein a colliding SL transmission can be determined from a pre-indication/reserved signal(s) received by UE-A and/or UE-A's sensing information and/or UE-A's own SL transmission (with overlap in time with the pre-indicated/reserved resource of UE-B). UE-A can indicate to UE-B that the pre-indicated/reserved resource is not preferred (e.g., has a detected conflict) for SL transmission. UE-B can reselect a different resource for SL transmission based on its own sensing and/or inter-UE co-ordination information from other UEs.

If the pre-indication/reservation signal from UE-B to UE-A includes more than one (e.g., N, with N>1) resource, UE-A can determine a single outcome for that status of the N pre-indicated/reserved resource. According to one of the following. (1) If any resource pre-indicated/configured SL resource has a conflict, UE-A indicates to UE-B resources have a conflict (e.g., not preferred), else (all pre-indicated/configured SL resources have no conflict) UE-A indicates to UE-B resources have no conflict (e.g., preferred). (2) If all pre-indicated/configured SL resources have a conflict, UE-A indicates to UE-B resources have a conflict (e.g., not preferred), else (at least one pre-indicated/configured SL resource has no conflict) UE-A indicates to UE-B resources have no conflict (e.g., preferred). (3) If first in-time pre-indicated/configured SL resource has a conflict, UE-A indicates to UE-B resources have a conflict (e.g., not preferred), else (first in-time pre-indicated/configured SL resource has no conflict) UE-A indicates to UE-B resources have no conflict (e.g., preferred).

In this example, the PSFCH-like (or feedback) channel or signal can indicate one of four levels: (i) ACK for successful reception of PSSCH and transmission on pre-indicated/reserved resource is preferred (e.g., no conflict detected on reserved resource), (ii) ACK for successful reception of PSSCH and transmission on pre-indicated/reserved resource is not preferred (e.g., conflict detected on reserved resource), (iii) NACK (failed reception of PSSCH) and transmission on pre-indicated/reserved resource is preferred (e.g., no conflict detected on reserved resource), and (iv) NACK (failed reception of PSSCH) and transmission on pre-indicated/reserved resource is not preferred (e.g., conflict detected on reserved resource).

For a PSFCH with four levels the following options can be considered, such as Option 1, described above (2-bit PSFCH, e.g., a PSFCH design with 4 cyclic shifts allocated to each resource).

FIG. 13E illustrates a PSFCH-like (feedback channel) signaling design 1300e, e.g., for unicast HARQ-ACK feedback and Groupcast HARQ-ACK reporting option (2), wherein for a two-bit PSFCH resource $m_{cs}$=6 indicates ACK with retransmission on reserved resource preferred (e.g., no conflict detected on reserved resource), $m_{cs}$=0, indicates NACK with retransmission on reserved resource preferred (e.g., no conflict detected on reserved resource), $m_{cs}$=9, indicates an ACK with retransmission on reserved resource not preferred (e.g., conflict detected on reserved resource), $m_{cs}$=3, indicates a NACK with retransmission on reserved resource not preferred (e.g., conflict detected on reserved resource) (the role of $m_{cs}$=9 and $m_{cs}$=3 can be switched).

FIG. 13F illustrates a PSFCH signaling design 1300f, e.g., for Groupcast HARQ-ACK reporting option (1), wherein for a two-bit PSFCH resource $m_{cs}$=0, indicates NACK with retransmission on reserved resource preferred (e.g., no conflict detected on reserved resource), $m_{cs}$=9, indicates an ACK with retransmission on reserved resource not preferred (e.g., conflict detected on reserved resource), and $m_{cs}$=3, indicates a NACK with retransmission on reserved resource not preferred (e.g., conflict detected on reserved resource) ($m_{cs}$=9 can be used instead of $m_{cs}$=3). There is no ACK feedback with pre-indicated/reserved resources preferred with Groupcast HARQ-ACK reporting option (1).

In certain embodiments (denoted as option 2), 2 1-bit PSFCH resources are allocated to a UE.

A first PSFCH resource can indicate the HARQ-ACK feedback. This resource can be common with UEs not implementing the scheme described in example 3.1. A second PSFCH (feedback channel) resource can be used to indicate whether a reserved resource is preferred (e.g., no conflict detected on reserved resource) or not (e.g., conflict detected on reserved resource) for a pre-indicated/reserved SL resource. For example, logical 1 one can indicate that a reserved resource is preferred (e.g., no conflict detected on reserved resource), and logical 0 can indicate that a reserved resource is not preferred (e.g., conflict detected on reserved resource), or vice versa. Option 2 includes the following sub-options.

A first sub-option is denoted as Option 2-1 (e.g., for Unicast and Groupcast HARQ-ACK reporting option (2)). In case of ACK and reserved resource is preferred (e.g., no conflict detected on reserved resource), indicate ACK on the first PSFCH resource, and indicate reserved resource is preferred on the second resource. In case of ACK and reserved resource is not preferred (e.g., conflict detected on reserved resource), indicate ACK on the first PSFCH resource, and indicate reserved resource is not preferred on the second resource. In case of NACK and reserved resource is preferred (e.g., no conflict detected on reserved resource), indicate NACK on the first resource, and indicate reserved resource is preferred on the second resource. In case of NACK and reserved resource is not preferred (e.g., conflict detected on reserved resource), indicate NACK on the first resource, and indicate reserved resource is not preferred on the second resource. This option requires 2 PSFCH (and/or feedback channel) transmissions. This scheme can be extended to indicate the conflict status for each of N pre-indicated/reserved SL resources by having a PSFCH (feedback channel) for each pre-indicated/reserved SL resource in addition to the PSFCH for HARQ-ACK status. Therefore, there can be a total of N+1 PSFCH (and/or feedback channel) resources. Alternatively, the conflict status for the of N pre-indicated/reserved SL resources can be indicated using a single PSFCH (feedback channel) resource conveying one bit as described earlier, in this case only 2 PSFCH (and/or feedback channel) resources are needed. Alternatively, the N PSFCHes (feedback channels) can be replaced by one PSFCH (feedback channel) carrying N bits.

A second sub-option is noted as Option 2-2 (e.g., for Unicast and Groupcast HARQ-ACK reporting option (2)). In case of ACK and reserved resource is preferred (e.g., no conflict detected on reserved resource), indicate ACK on the first PSFCH resource, no transmission on the second PSFCH resource. In case of ACK and reserved resource is not preferred (e.g., conflict detected on reserved resource), indicate ACK on the second PSFCH resource, no transmission on the first PSFCH resource. In case of NACK and reserved resource is preferred (e.g., no conflict detected on reserved resource), indicate NACK on the first PSFCH resource, no transmission on the second PSFCH resource. In case of NACK and reserved resource is not preferred (e.g., conflict detected on reserved resource), no transmission on the first resource, and indicate NACK on the second resource. This option requires 1 PSFCH transmission in all cases.

A third sub-option is noted as Option 2-3 (e.g., Groupcast HARQ-ACK reporting option (1)). In case of ACK and reserved resource is preferred (e.g., no conflict detected on reserved resource), no transmission on the first resource, and indicate reserved resource is preferred on the second resource. In case of ACK and reserved resource is not preferred (e.g., conflict detected on reserved resource), no transmission on the first resource, and indicate reserved resource is not preferred on the second resource. In case of NACK and reserved resource is preferred (e.g., no conflict detected on reserved resource), indicate NACK on the first resource, and indicate reserved resource is preferred on the second resource. In case of NACK and reserved resource is not preferred (e.g., conflict detected on reserved resource), indicate NACK on the first resource, and indicate reserved resource is not preferred on the second resource. This option requires 2 PSFCH (and/or feedback channel) transmissions in case of NACK. There is no ACK feedback with Groupcast HARQ-ACK reporting option (1). This scheme can be extended to indicate the conflict status for each of N pre-indicated/reserved SL resources by having a PSFCH (feedback channel) for each pre-indicated/reserved SL resource in addition to the PSFCH for HARQ-ACK status. Therefore, there can be a total of N+1 PSFCH (and/or feedback channel) resources. Alternatively, the conflict status for the of N pre-indicated/reserved SL resources can be indicated using a single PSFCH (feedback channel) resource conveying one bit as described earlier, in this case only 2 PSFCH (and/or feedback channel) resources are needed. Alternatively, the N PSFCHes (feedback channels) can be replaced by one PSFCH (feedback channel) carrying N bits.

A fourth sub-option is noted as Option 2-4 (Single PSFCH Resource) (e.g., for Groupcast HARQ-ACK reporting option (1)). In case of ACK and reserved resource is preferred (e.g., no conflict detected on reserved resource), no transmission on PSFCH resource. In case of ACK and reserved resource is not preferred (e.g., conflict detected on reserved resource), transmit a first cyclic shift corresponding to pre-indicated/reserved resource not preferred. In case of NACK and reserved resource is preferred (e.g., no conflict detected on reserved resource), transmit a second cyclic shift corresponding to NACK. In case of NACK and reserved resource is not preferred (e.g., conflict detected on reserved resource), transmit a first and a second cyclic shift corresponding to pre-indicated/reserved resource not preferred and NACK. This option requires transmission of up to two cyclic shifts on a PSFCH resource. Alternatively, in case of NACK and reserved resource is not preferred (e.g., conflict detected on reserved resource), transmit a third cyclic shift corresponding to pre-indicated/reserved resource not preferred and NACK. There is no ACK feedback with Groupcast HARQ-ACK reporting option (1).

In case of Groupcast HARQ-ACK Feedback, the PSFCH resource indicating preferred (e.g., no conflict detected on reserved resource) or non-preferred pre-indicated/reserved resource (e.g., a resource that has a collision or conflict) can be in a first example UE specific, or it can be in a second example UE-common (i.e., one resource for all UEs in the groupcast set). When the UE is transmitting feedback to indicate preferred (e.g., no conflict detected on reserved resource) or non-preferred (e.g., conflict detected on reserved resource) pre-indicated/reserved resource, it can in a first example transmit a logical level for a preferred pre-indicated/reserved resource and transmit a second logical level for non-preferred pre-indicated/reserved resource; or in a second example it can transmit a signal for a preferred pre-indicated/reserved resource and no transmission (DTX) for non-preferred pre-indicated/reserved resource; or in a third example it can transmit a signal for a non-preferred pre-indicated/reserved resource and no transmission (DTX) for a preferred pre-indicated/reserved resource.

For example (example 3.1.1.3), a UE-A does not transmit HARQ-ACK feedback on PSFCH in response to a PSCCH/PSSCH transmission in a SL slot (e.g., blind retransmissions or in response with a PSCCH with reserved resources and without an associated PSSCH). If the PSSCH transmission is not successfully decoded or is not scheduled by the PSCCH, a UE-B can (re-)transmit on a pre-indicated/reserved resource if UE-A determines that it is available (i.e., no conflict detected on reserved resource).

If UE-A determines that the pre-indicated or reserved SL resource does not overlap or collide in time and frequency domains with a second SL transmission, or if the pre-indicated or reserved SL resource collides or overlaps in time and frequency domains with a second SL transmission, but has the highest priority and/or the highest SL RSRP and/or SL RSRP above a threshold, wherein a second SL transmission can be determined from a pre-indication/reserved signal(s) received by UE-A and/or UE-A's sensing information and/or UE-A's own SL transmission (with overlap in time with the pre-indicated/reserved resource of UE-B). A conflict due to sensing can take into account the SL RSRP of the SL resources involved in the collision for determining whether a pre-indicated/reserved SL resource from UE-B has a conflict, as described earlier in this disclosure. UE-A can indicate to UE-B that the pre-indicated/reserved resource is preferred for SL transmission, e.g., that the pre-indicated/reserved resource has no conflict.

Alternatively, if the UE-A determines that the pre-indicated or reserved SL resource collides or overlaps in time and frequency domains with another SL transmission, but has a lower priority and/or lower SL RSRP than any of the colliding SL transmissions and/or SL RSRP below a threshold, wherein a colliding SL transmission can be determined from a pre-indication/reserved signal(s) received by UE-A and/or UE-A's sensing information and/or UE-A's own SL transmission (with overlap in time with the pre-indicated/reserved resource of UE-B). UE-A can indicate to UE-B that the pre-indicated/reserved resource is not preferred (e.g., has a detected conflict) for SL transmission. UE-B can reselect a different resource for SL transmission based on its own sensing and/or inter-UE co-ordination information from other UEs.

If the pre-indication/reservation signal from UE-B to UE-A includes more than one (e.g., N, with N>1) resource, UE-A can determine a single outcome for that status of the N pre-indicated/reserved resource. According to one of the following. (1) If any resource pre-indicated/configured SL resource has a conflict, UE-A indicates to UE-B resources have a conflict (e.g., not preferred), else (all pre-indicated/configured SL resources have no conflict) UE-A indicates to UE-B resources have no conflict (e.g., preferred). (2) If all pre-indicated/configured SL resources have a conflict, UE-A indicates to UE-B resources have a conflict (e.g., not preferred), else (at least one pre-indicated/configured SL resource has no conflict) UE-A indicates to UE-B resources have no conflict (e.g., preferred). (3) If first in-time pre-indicated/configured SL resource has a conflict, UE-A indicates to UE-B resources have a conflict (e.g., not preferred), else (first in-time pre-indicated/configured SL resource has no conflict) UE-A indicates to UE-B resources have no conflict (e.g., preferred).

In this example, the PSFCH-like (or feedback) channel or signal can indicate one of two levels. The regular PSFCH design of NR release 16 can be reused for the feedback channel.

This scheme can be extended to indicate the conflict status for each of N pre-indicated/reserved SL resources by having a PSFCH (feedback channel) for each pre-indicated/reserved SL resource in addition to the PSFCH for HARQ-ACK status. Therefore, there can be a total of N PSFCH resources. Alternatively, the conflict status for the of N pre-indicated/reserved SL resources can be indicated using a single PSFCH resource conveying one bit as described earlier. Alternatively, the N PSFCHes (feedback channels) can be replaced by one PSFCH (feedback channel) carrying N bits.

For another example (example 3.1.2), the PSCCH transmission is not associated with a PSSCH transmission in a same SL slot. The PSCCH includes SCI that indicates N SL resources reserved in a future SL slot. A UE can (re-)transmit on a pre-indicated/reserved resource if UE-A determines that it is available. In one example N=1. In another example, N=2. In another example, N is larger than 2 and specified in the system specification and/or pre-configured and/or configured or updated by RRC signaling and/or MAC CE signaling and/or L1 control signaling.

If UE-A determines that the pre-indicated or reserved SL resource does not overlap or collide in time and frequency domains with a second SL transmission, or if the pre-indicated or reserved SL resource collides or overlaps in time and frequency domains with a second SL transmission, but has the highest priority and/or the highest SL RSRP and/or SL RSRP above a threshold, wherein a second SL transmission can be determined from a pre-indication/reserved signal(s) received by UE-A and/or UE-A's sensing information and/or UE-A's own SL transmission (with overlap in time with the pre-indicated/reserved resource of UE-B). A conflict due to sensing can take into account the SL RSRP of the SL resources involved in the collision for determining whether a pre-indicated/reserved SL resource from UE-B has a conflict, as described earlier in this disclosure. UE-A can indicate to UE-B that the pre-indicated/reserved resource is preferred for SL transmission, e.g., that the pre-indicated/reserved resource has no conflict.

Alternatively, if UE-A determines that the pre-indicated or reserved SL resource collides or overlaps in time and frequency domains with another SL transmission, but has a lower priority and/or lower SL RSRP than any of the colliding SL transmissions and/or SL RSRP below a threshold, wherein a colliding SL transmission can be determined from a pre-indication/reserved signal(s) received by UE-A and/or UE-A's sensing information and/or UE-A's own SL transmission (with overlap in time with the pre-indicated/reserved resource of UE-B). UE-A can indicate to UE-B that the pre-indicated/reserved resource is not preferred (e.g., has a detected conflict) for SL transmission. UE-B can reselect a different resource for SL transmission based on its own sensing and/or inter-UE co-ordination information from other UEs.

In this example the PSFCH-like (or feedback) channel or signal can indicate one of two levels. The regular PSFCH design of NR release 16 can be reused.

Figure 14:
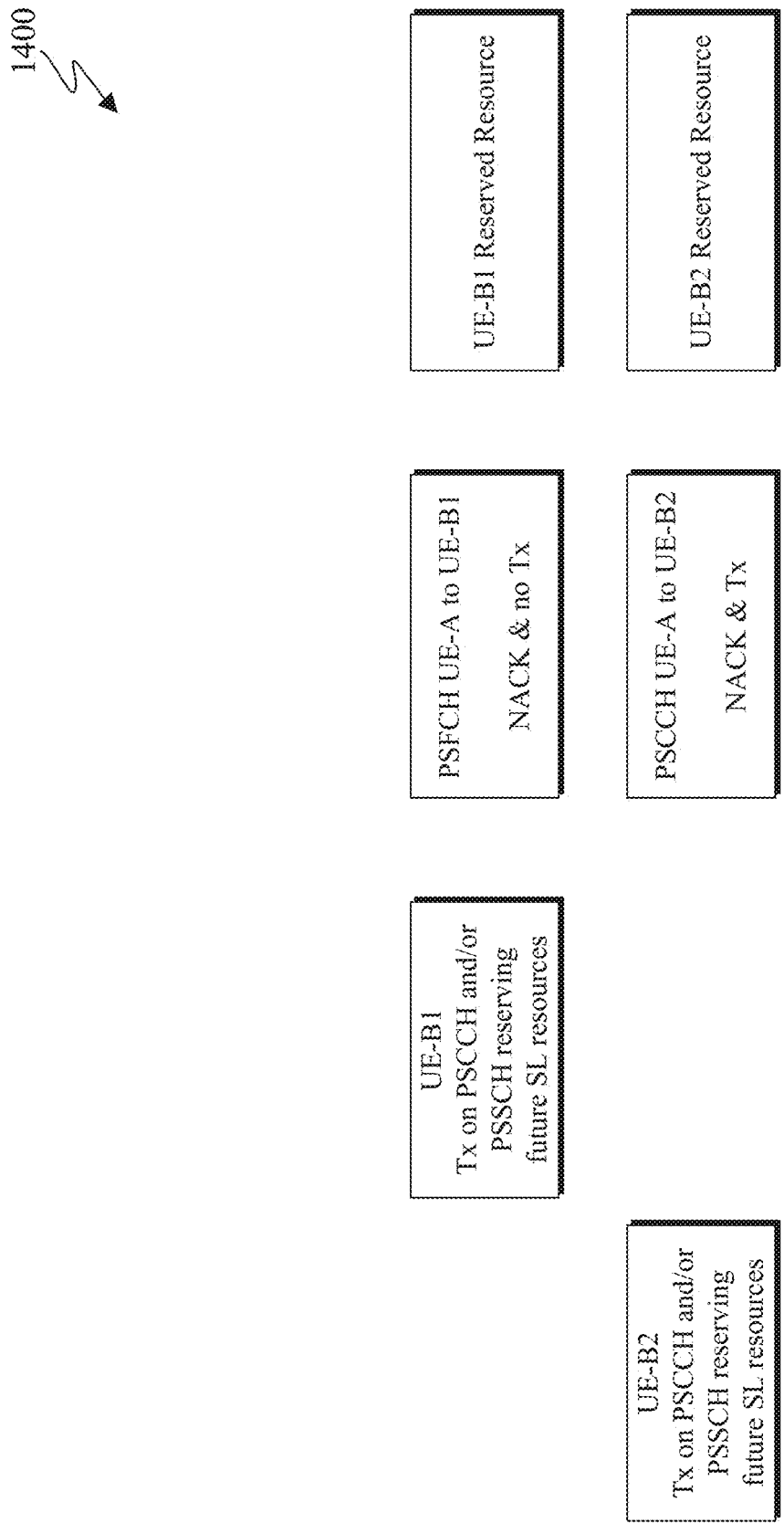
FIG. 14 illustrates an example signaling using a PSCCH or physical sidelink shared channel (PSSCH) for a resource reservation for a SL transmission on a future SL resource according to embodiments of present disclosure.

FIG. 14 illustrates an example signaling 1400 using a PSCCH and/or PSSCH for a resource reservation for a SL transmission on a future SL resource according to embodiments of present disclosure. FIG. 14 is an example following example 3.1.1, described above. Two UE-Bs (i.e., UE-B1 and UE-B2) transmit PSCCH/PSSCH that includes a resource reservation for a SL transmission on a future SL resource. The reserved resource of UE-B1 and UE-B2 overlap. UE-A fails to decode the transmissions of UE-B1 and UE-B2. UE-A determines that the resources reserved by UE-B1 and UE-B2 overlap or collide. UE-A determines which SL transmission (UE-B1 or UE-B2) has a higher priority and/or higher SL RSRP and/or SL RSRP above a threshold. For example, this can be determined based on the priority field of the first stage SCI in PSCCH or based on UE-A's own implementation. For example, in this case, the UE-B2 can have a SL transmission with a higher priority than the priority of a SL transmission from UE-B1. UE-A indicates a NACK to UE-B1 (if applicable) and that the pre-indicated or reserved SL resource is not preferred. UE-A indicates a NACK to UE-B2 (if applicable) and that the pre-indicated or reserved SL resource is preferred. UE-B2 can be proceed with the SL (re-)transmission on the pre-indicated or reserved resource. UE-B1 can perform resource reselection to a select a different SL resource for the SL (re-)transmission.

For another example (example 3.2), the pre-indication/reservation signal can be included in PSCCH and/or PSSCH transmission following the examples of component 2, and the grant/trigger signaling can be included in a PSFCH-like transmission or feedback channel following the examples of component 1.

For yet another example (example 3.3), the pre-indication/reservation signal can be included in PSFCH-like transmission following the examples of component 1, and the grant/trigger signaling can be included in a PSCCH transmission and/or PSSCH transmission following the examples of component 2.

Embodiments of the present disclosure also describe converting physical duration to logical sidelink slots. The following examples and embodiments describe converting physical duration to logical sidelink slots.

Additionally, the set of slots belonging to the SL resource pool, of Equation (1), are based on the following. Each resource pool has a corresponding bitmap ($b_0$, $b_1$, ..., $b_{L_{bitmap}-1}$) of length $L_{bitmap}$. A slot $t_k^{SL}$ belongs to the bitmap if $b_{k \bmod L_{bitmap}} = 1$. The remaining slots are indexed successively staring from 0, 1, ... $T'_{MAX}-1$. Where, $T'_{MAX}$ is the number of remaining slots in the set.

In certain embodiments, slots can be numbered (indexed) as physical slots or logical slots, wherein physical slots, include all slots numbered sequential, while logical slots include only slots that can be allocated to sidelink resource pool as described above numbered sequentially. The conversion from a physical duration, $P_{rsvp}$, in milli-second to a logical slots, $P_{rsvp}'$ has previously been described in Equation (9).

$$P'_{rsvp} = \left\lceil \frac{N}{20 \text{ ms}} \times P_{rsvp} \right\rceil \quad (9)$$

Here, N is the number of slots that can be used for SL transmission within 20 ms of the configured UL-DL.

It is noted that 3GPP Release 16 is the first NR release to include sidelink through work item "5G V2X with NR sidelink", the mechanisms introduced focused mainly on vehicle-to-everything (V2X), and can be used for public safety when the service requirement can be met. In release 16, the formula for conversion from physical slots (physical duration) to logical slots is based on a given resource reservation period $P_{rsvp}$ in milliseconds that is converted to a period $P_{rsvp}'$ in logical slots as Equation (9).

The principle of this conversion is to ensure that the duration in logical slots, i.e., $P_{rsvp}'$ is roughly equal to the physical duration $P_{rsvp}$. This equation does not take into account (i) the resource bitmap, wherein not all SL slots can be used for a SL resource pool and (ii) the S-SSB slots, $N_{S-SSB}$, and the reserved slots, not included in the resource pool, $N_{reserved}$.

Embodiments of the present disclosure take into consideration that the duration in logical slots can be longer than the physical duration. Accordingly, embodiments of the present disclosure modify Equation (9) to better align the logical slot duration with the physical duration.

Furthermore, for configured grant Type 1, for determining the $S^{th}$ sidelink grant is described in Equation (10), below. Additionally, for configured grant Type 2, for determining the $S^{th}$ sidelink grant is described in Equation (11).

$$[(SFN \times numberOfSLSlotsPerFrame) + \text{logical slot number in the frame}] = (sl\text{-}TimeReferenceSFN\text{-}Type1 \times numberOfSLSlotsPerFrame + sl\text{-}TimeOffsetCGType1 + S \times PeriodicitySL) \bmod (1024 \times numberOfSLSlotsPerFrame) \quad (10)$$

$$[(SFN \times numberOfSLSlotsPerFrame) + \text{logical slot number in the frame}] = [(SFNstart\ time \times numberOfSLSlotsPerFrame + slotstart\ time) + S \times PeriodicitySL] \bmod (1024 \times numberOfSLSlotsPerFrame). \quad (11)$$

Here, $$PeriodicitySL = \left\lceil \frac{N}{20 \text{ ms}} \times sl\_periodCG \right\rceil.$$

Also, numberOfSLSlotsPerFrame refers to the number of logical slots that can be used for SL transmission in the frame. N refers to the number of slots that can be used for SL transmission within 20 ms, of TDD-UL-DL-ConfigCommon of the serving cell, if provided, or sl-TDD-Configuration, if provided, or sl-TDD-Config of the received PSBCH. $SFN_{start\ time}$ and $slot_{start\ time}$ are the SFN and logical slot, respectively, of the first transmission opportunity of PSCCH/PSSCH where the configured sidelink grant was (re-) initialised.

The above equations for configured grant Type 1 and configured grant Type 2 do not take into account that (i) the resource bitmap, wherein not all SL slots can be used for a SL resource pool and (ii) the S-SSB slots, $N_{S-SSB}$, and the reserved slots, not included in the resource pool, $N_{reserved}$.

Accordingly, embodiments of the present disclosure describe signaling and methods for converting a physical duration to a logical slot duration. Embodiments of the present disclosure also describe equations for the resources of configured grant Type 1 and configured grant type 2.

In certain embodiments, N is the number of slots that can be used for SL transmission within 20 ms, which excludes Non-SL slots. In 1024 frames (10240 ms). The number of slots that can be used for SL transmission excluding Non-SL slots, is described in Equation (12).

$$2^\mu \times 10240 - N_{nonSL} = 512 \cdot N \quad (12)$$

In addition to $N_{nonSL}$ slots, S-SBB slots ($N_{S-SSB}$) and reserved slots, not included in the resource pool, ($N_{reserved}$) are excluded from the SL slots that maybe included in a SL resource pool. The number of slots that may be included in a SL resource pool across 1024 frames is expressed in Equation (13). Additionally, the number of SL slots that may be included in a SL resource pool in 20 ms is expressed in Equation (14).

$$2^\mu \times 10240 - N_{nonSL} - N_{S-SSB} - N_{reserved} = 512 \cdot N - N_{S-SSB} - N_{reserved} \quad (13)$$

$$N = \frac{N_{S-SSB} + N_{reserved}}{512} \quad (14)$$

Furthermore, the slots that actually belong to a resource pool is given by a bitmap of length $L_{bitmap}$. The number of such slots (i.e., slots where the corresponding bit is logical 1) can be expressed as $L_{bitmap,one}$. Accordingly, the total number of slots in a SL resource pool across 1024 frames described in Equation (15). Therefore, the number of slots in a SL resource pool within 20 ms is described in Equation (16).

$$(2^\mu \times 10240 - N_{nonSL} - N_{S-SSB} - N_{reserved}) \times \frac{L_{bitmap,one}}{L_{bitmap}} = \quad (15)$$

$$(512 \cdot N - N_{S-SSB} - N_{reserved}) \times \frac{L_{bitmap,one}}{L_{bitmap}}$$

$$N_{SL-RP} = \left(N - \frac{N_{S-SSB} + N_{reserved}}{512}\right) \times \frac{L_{bitmap,one}}{L_{bitmap}} \quad (16)$$

The conversion from a physical duration, $P_{rsvp}$, in millisecond to a logical slots, $P_{rsvp}'$, is described in Equation (17). In Equation (17), the expression, $N_{SL-RP}$, is defined in Equation (17.1).

$$P'_{rsvp} = \left\lceil \frac{N_{SL-RP}}{20 \text{ ms}} \times P_{rsvp} \right\rceil \quad (17)$$

$$N_{SL-RP} = \left(N - \frac{N_{S-SSB} + N_{reserved}}{512}\right) \times \frac{L_{bitmap,one}}{L_{bitmap}} \quad (17.1)$$

Here, the expression N is the number of slots that can be used for SL in 20 ms interval. The expression, $N_{S-SSB}$ is the number of S-SSB slots across 1024 frames. The expression, $N_{reserved}$ is the number of reserved slots, not included in the resource pool, across 1024 frames. The expression, $L_{bitmap}$ is the length of the bitmap of the SL resource pool. The expression, $L_{bitmap,one}$ is the number of bits in the bitmap of the SL resource pool with logical 1. $N_{SL-RP}$ is the number of SL slots within a resource pool within 20 ms interval. $N_{SL-RP}$ can be a number that includes a fraction part.

In certain embodiments, the expression $N_{reserved}$ is ignored, such as when the value is small relative to the number of available slots. When the expression $N_{reserved}$ is ignored, Equation 17.1 is described in Equation (18).

$$N_{SL-RP} = \left(N - \frac{N_{S-SSB} + N_{reserved}}{512}\right) \times \frac{L_{bitmap,one}}{L_{bitmap}} \quad (18)$$

In certain embodiments, the expression $N_{S-SSB,20}$ is the number of S-SSB slots in 20 ms, wherein the number can be an integer or a fraction. When the number of S-SSBs varies from one 20 ms interval to the next, $N_{S-SSB,20}$ is the average number of S-SSB slots across 20 ms, averaged across 1024 frames, and described in Equation (19).

$$N_{SL-RP} = (N - N_{S-SSB,20}) \times \frac{L_{bitmap,one}}{L_{bitmap}} \quad (19)$$

In certain embodiments, the expression N excludes the S-SSB slots. If the number of S-SSB slots is the same across each 20 ms interval, N is an integer, if the number of S-SSB slots varies across 20 ms intervals, N is the average number of the slots that can be included in a SL resource pool across 20 ms averaged across 1024 frames, as described in Equation (20).

$$N_{SL-RP} = N \times \frac{L_{bitmap,one}}{L_{bitmap}} \quad (20)$$

In certain embodiments, the expression N is the average number of SL slots in a SL resource pool, as the number of SL slots in a resource pool can vary from one 20 ms interval to the next, N is determined as the average number of SL slots in a sidelink resource pool averaged across 1024 frames, as described in Equation (21).

$$N_{SL-RP} = N \quad (21)$$

Accordingly, N×512 is the total number of slots that can be used for SL transmission in 1024 frames or 10240 ms. Then $N_{SL-RP}$ is the number of slots that can be used for SL transmission in 20 ms, as described in Equation (22), Equation (23), and Equation (24) based on Equation (17) and Equation (17.1).

$$P'_{rsvp} = \left\lceil \frac{N_{SL-RP}}{20 \text{ ms}} \times P_{rsvp} \right\rceil \quad (22)$$

$$= \left\lceil \frac{1}{20 \text{ ms}} \left(N - \frac{N_{S-SSB} + N_{reserved}}{512}\right) \times \frac{L_{bitmap,one}}{L_{bitmap}} \times P_{rsvp} \right\rceil \quad (23)$$

$$\left\lceil \frac{1}{512 \times 20 \text{ ms}} (512 \times N - N_{S-SSB} - N_{reserved}) \times \frac{L_{bitmap,one}}{L_{bitmap}} \times P_{rsvp} \right\rceil \quad (24)$$

It is noted that the expression, $$(512 \times N - N_{S-SSB} - N_{reserved}) \times \frac{L_{bitmap,one}}{L_{bitmap}},$$

is the number of SL slots in a resource pool in 1024 frames or 10240 ms, which can be denoted as $T'_{max}$. Accordingly, Equation (25), below, modifies Equation (22), above.

$$P'_{rsvp} = \left\lceil \frac{T'_{max}}{10240 \text{ ms}} \times P_{rsvp} \right\rceil \quad (25)$$

Now we consider the equations to determine the slots for configured grant. After (i) removing the S-SSB slots, and (ii) removing the reserved slots, not included in the resource pool, and (iii) applying the bitmap, the number of slots in a frame (10 ms) that are in a resource pool varies from one frame to the next. Therefore, to get the total number slots in a resource pool from the start of system frame number 0 to the start of system frame number SFN, the slots of a resource pool in a frame are summed, as described in Equation (26).

$$\Sigma_{i=0}^{SFN-1} \text{SlotsOfSLResourcePoolinFrame}(i) \quad (26)$$

Here, the expression SlotsOfSLResourcePoolinFrame(i) is the number of slots of a resource pool in a frame with index i. Similarly, for sl_TimeReferenceSFF_Type1, the total number of slots of a resource pool from the start of system frame number 0 to the start of system frame number sl_TimeReferenceSFF_Type1 is described in Equation (27).

$$\sum_{i=0}^{sl\text{-}TimeReferenceSFF\_Type1-1} SlotsOfSLResourcePoolinFrame(i) \quad (27)$$

The conversion of the configured grant period in milliseconds to slots of a resource pool follows the same principle as has been previously presented for $P_{rsvp}$, and represented in Equation (28).

$$PeriodicitySL = \left\lceil \frac{T'_{max}}{10240 \text{ ms}} \times sl\_periodCG \right\rceil \quad (28)$$

Therefore, for configured grant Type 1, the equation for determining the SL slots within a resource pool for $S^{th}$ sidelink grant is described in Equation (29). Equation (30) described the scenario of when sl_TimeReferenceSFF_Type1∈{0,512} and as the reserved slots are evenly distributed throughout the 1024 frames. Equation (31) is the result of combining Equation (29) and Equation (30).

$$\left[ \left( \sum_{i=0}^{SFN-1} SlotsOfSLResourcePoolinFrame(i) \right) + \right. \quad (29)$$

$$\text{logical slot number in the frame} \Big] =$$

$$\left( \sum_{i=0}^{sl\text{-}TimeReferenceSFF\_Type1-1} SlotsOfSLResourcePoolinFrame(i) + \right.$$

$$\left. sl\text{-}TimeOffsetCGType1 + S \times PeriodicitySL \right) \text{ modulo } (T'_{max}).$$

$$\sum_{i=0}^{sl\text{-}TimeReferenceSFF\_Type1-1} SlotsOfSLResourcePoolinFrame(i) = \quad (30)$$

$$\left\lceil T'_{max} \frac{sl\text{-}TimeReferenceSFF\_Type1}{1024} \right\rceil.$$

$$\left[ \left( \sum_{i=0}^{SFN-1} SlotsOfSLResourcePoolinFrame(i) \right) + \right. \quad (31)$$

$$\text{logical slot number in the frame} \Big] =$$

$$\left( \left\lceil T'_{max} \frac{sl\text{-}TimeReferenceSFF\_Type1}{1024} \right\rceil + \right.$$

$$\left. sl\text{-}TimeOffsetCGType1 + S \times PeriodicitySL \right) \text{ modulo } (T'_{max}).$$

If the S−1 configured grant Type 1 SL transmission is in logical slot $SL_{S-1}$, the S configured grant SL transmission is in logical slot $SL_S$, wherein, according to equation (31) $SL_S = \text{mod}(SL_{S-1} + PeriodicitySL, T'_{max})$.

Similarly, for configured grant Type 2, Equation (32) describes determining the SL slots within a resource pool for $S^{th}$ sidelink. It is noted that the expressions, $SFN_{start\ time}$ and $slot_{start\ time}$ are the SFN and logical slot, respectively, of the first transmission opportunity of PSSCH where the configured sidelink grant was (re-)initialised.

$$[(\sum_{i=0}^{SFN-1} SlotsOfSLResourcePoolinFrame(i)) + \text{logi-}$$
$$\text{cal slot number in the frame}] =$$
$$[(\sum_{i=0}^{SFNstart\ time-1} SlotsOfSLResourcePoolin\text{-}$$
$$Frame(i) + slot_{start\ time}) + S \times PeriodicitySL] \text{ modulo}$$
$$(T'_{max}). \quad (32)$$

If the S−1 configured grant Type 2 SL transmission is in logical slot $SL_{S-1}$, the S configured grant SL transmission is in logical slot $SL_S$, wherein, according to equation (32) $SL_S = \text{mod}(SL_{S-1} + PeriodicitySL, T'_{max})$.

The above flowcharts and signaling diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:
    a processor configured to determine a logical slot for a $S^{th}$ sidelink grant for a sidelink configured grant type 1 based on:
    (sl-ReferenceSlotCG-Type1+sl-TimeOffsetCGType1+S× PeriodicitySL) modulo ($T'_{max}$),
    wherein:
        sl-ReferenceSlotCG-Type1 is a reference logical slot defined based on sl-TimeReferenceSFF_Type1,
        sl_TimeReferenceSFN_Type1 is a system frame number determined as 0 or 512,
        sl-TimeOffsetCGType1 is an offset of a resource with respect to the reference logical slot defined based on sl-TimeReferenceSFN_Type1 in time domain, $PeriodicitySL$ is defined as $\left\lceil \frac{T'_{max}}{10240 \text{ ms}} \times sl\_periodCG \right\rceil$, sl_periodCG is a periodicity of the sidelink configured grant type 1, and
    $T'_{max}$ is a number of slots that belongs to a resource pool and defined based on a number of slots corresponding to bits having value 1 within a bitmap, among a set of slots excluding at least one non-SL slot, at least one non S-SSB slot, and at least one reserved slot.

2. The UE of claim 1, wherein the processor is further configured to determine a logical slot for a $S^{th}$ sidelink grant for a sidelink configured grant type 2 based on:
    [sl-StartSlotCG-Type2+S×PeriodicitySL] modulo ($T'_{max}$),
    wherein sl-StartSlotCG-Type2 is a logical slot of a first transmission opportunity of a physical sidelink shared channel (PSSCH) where a configured sidelink grant was (re-)initialized.

3. The UE of claim 1, wherein:

$$T'_{max} = \left(2^{\mu} \times 10240 - N_{nonSL} - N_{S-SSB} - N_{reserved}\right) \times \frac{L_{bitmap,one}}{L_{bitmap}},$$

μ: is a sub-carrier spacing configuration,
$N_{nonSL}$: is a number of non-SL slots,
$N_{S-SSB}$: is a number of S-SSB slots,
$N_{reserved}$: is a number of reserved slots,
$L_{bitmap,one}$: is a number of bits having value 1 in the bitmap associated with the resource pool, and
$L_{bitmap}$: is a total number of bits in the bitmap associated with the resource pool.

4. A method performed by a user equipment (UE) in a communication system, the method comprising:
  determining a logical slot for a $s^{th}$ sidelink grant for a sidelink configured grant type 1 based on:
  (sl-ReferenceSlotCG-Type1+sl-TimeOffsetCGType1+S× PeriodicitySL) modulo ($T'_{max}$),
  wherein:
    sl-ReferenceSlotCG-Type1 is a reference logical slot defined based on sl-TimeReferenceSFN_Type1,
    sl_TimeReferenceSFN_Type1 is a system frame number determined as 0 or 512,
    sl-TimeOffsetCGType1 is an offset of a resource with respect to the reference logical slot defined based on sl-TimeReferenceSFN_Type1 in time domain, $$PeriodicitySL = \left\lceil \frac{T'_{max}}{10240 \text{ ms}} \times \text{sl\_periodCG} \right\rceil$$

sl_periodCG is a periodicity of the sidelink configured grant type 1, and
$T'_{max}$ is a number of slots that belongs to a resource pool and defined based on a number of slots corresponding to bits having value 1 within a bitmap, among a set of slots excluding at least one non-SL slot, at least one non S-SSB slot, and at least one reserved slot.

5. The method of claim 4, further comprising:
determining a logical slot for a $S^{th}$ sidelink grant for a sidelink configured grant type 2 based on:
[sl-StartSlotCG-Type2+S×PeriodicitySL] modulo ($T'_{max}$),
wherein sl-StartSlotCG-Type2 is a logical slot of a first transmission opportunity of a physical sidelink shared channel (PSSCH) where a configured sidelink grant was (re-)initialized.

6. The method of claim 4, wherein:

$$T'_{max} = \left(2^{\mu} \times 10240 - N_{nonSL} - N_{S-SSB} - N_{reserved}\right) \times \frac{L_{bitmap,one}}{L_{bitmap}},$$

μ: is a sub-carrier spacing configuration,
$N_{nonSL}$: is a number of non-SL slots,
$N_{S-SSB}$: is a number of S-SSB slots,
$N_{reserved}$: is a number of reserved slots,
$L_{bitmap}$, one: is a number of bits having value 1 in the bitmap associated with the resource pool, and
$L_{bitmap}$: is a total number of bits in the bitmap associated with the resource pool.

\* \* \* \* \*